US012619336B2

(12) United States Patent
Toshimitsu

(10) Patent No.: US 12,619,336 B2
(45) Date of Patent: May 5, 2026

(54) INFORMATION PROCESSING APPARATUS, NON-TRANSITORY COMPUTER READABLE MEDIUM STORING PROGRAM, AND INFORMATION PROCESSING METHOD FOR ARRANGING THUMBNAILS OF VARIOUS THUMBNAIL GROUPS

(71) Applicant: FUJIFILM Business Innovation Corp., Tokyo (JP)

(72) Inventor: Koki Toshimitsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/899,602

(22) Filed: Aug. 30, 2022

(65) Prior Publication Data

US 2023/0315251 A1 Oct. 5, 2023

(30) Foreign Application Priority Data

Mar. 29, 2022 (JP) ................................ 2022-052795

(51) Int. Cl.

| | |
|---|---|
| ***G06F 3/04817*** | (2022.01) |
| ***G06F 3/0482*** | (2013.01) |
| ***G06F 16/93*** | (2019.01) |
| ***H04N 1/00*** | (2006.01) |

(52) U.S. Cl.

CPC ........ *G06F 3/04817* (2013.01); *G06F 3/0482* (2013.01); *G06F 16/93* (2019.01); *H04N 1/00442* (2013.01)

(58) Field of Classification Search

CPC .. G06F 3/04817; G06F 3/0482; G06F 40/106; G06F 3/04886; G06F 16/287; G06F 16/93; H04N 1/00442

See application file for complete search history.

(56) References Cited

U.S. PATENT DOCUMENTS

| | | | | | |
|---|---|---|---|---|---|
| 5,838,317 | A * | 11/1998 | Bolnick | G06F 3/013 | 715/764 |
| 2006/0112354 | A1* | 5/2006 | Park | G06F 3/0481 | 715/835 |
| 2014/0082566 | A1* | 3/2014 | Matsuo | G06F 3/0482 | 715/838 |
| 2016/0048530 | A1* | 2/2016 | Sato | G06F 3/0482 | 345/635 |
| 2017/0329489 | A1 | 11/2017 | Arakawa | | |

FOREIGN PATENT DOCUMENTS

| | | |
|---|---|---|
| JP | 2009151348 | 7/2009 |
| JP | 2017204115 | 11/2017 |

OTHER PUBLICATIONS

"Notice of Reasons for Refusal of Japan Counterpart Application", issued on Nov. 25, 2025, with English translation thereof, pp. 1-8.

* cited by examiner

*Primary Examiner* — Nicholas Ulrich

(74) *Attorney, Agent, or Firm* — JCIPRNET

(57) ABSTRACT

An information processing apparatus including a processor is provided. The processor is configured to determine a thumbnail group to which a thumbnail as a target in a reduction display belongs by arranging the thumbnail, and perform the reduction display in a mode of arranging the thumbnail belonging to the thumbnail group and another thumbnail other than the thumbnail such that the thumbnail and the other thumbnail are close to each other.

12 Claims, 22 Drawing Sheets

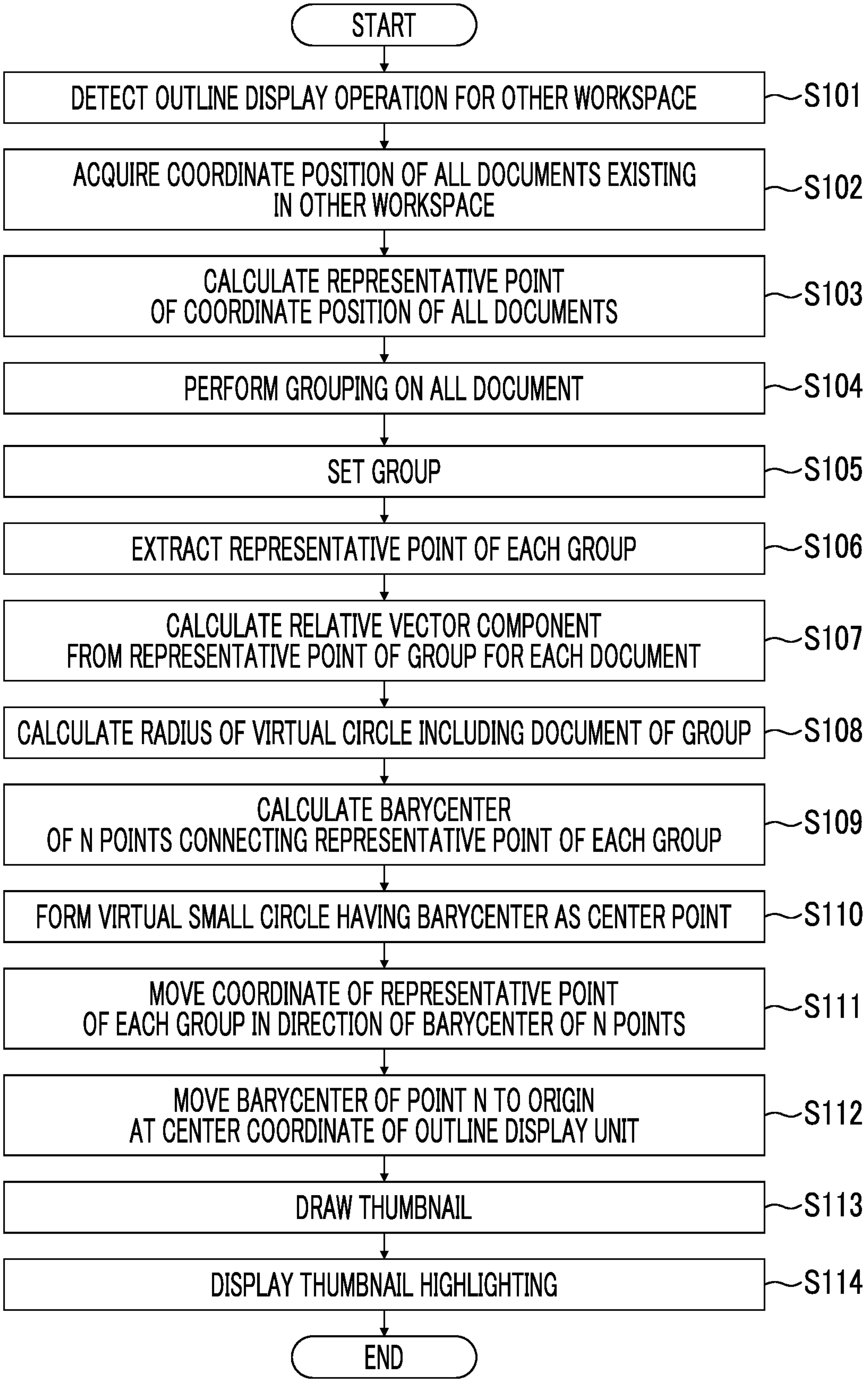

FIG. 10

START

DETECT OUTLINE DISPLAY OPERATION FOR OTHER WORKSPACE —S101

ACQUIRE COORDINATE POSITION OF ALL DOCUMENTS EXISTING IN OTHER WORKSPACE —S102

CALCULATE REPRESENTATIVE POINT OF COORDINATE POSITION OF ALL DOCUMENTS —S103

PERFORM GROUPING ON ALL DOCUMENT —S104

SET GROUP —S105

EXTRACT REPRESENTATIVE POINT OF EACH GROUP —S106

CALCULATE RELATIVE VECTOR COMPONENT FROM REPRESENTATIVE POINT OF GROUP FOR EACH DOCUMENT —S107

CALCULATE RADIUS OF VIRTUAL CIRCLE INCLUDING DOCUMENT OF GROUP —S108

CALCULATE BARYCENTER OF N POINTS CONNECTING REPRESENTATIVE POINT OF EACH GROUP —S109

FORM VIRTUAL SMALL CIRCLE HAVING BARYCENTER AS CENTER POINT —S110

MOVE COORDINATE OF REPRESENTATIVE POINT OF EACH GROUP IN DIRECTION OF BARYCENTER OF N POINTS —S111

MOVE BARYCENTER OF POINT N TO ORIGIN AT CENTER COORDINATE OF OUTLINE DISPLAY UNIT —S112

DRAW THUMBNAIL —S113

DISPLAY THUMBNAIL HIGHLIGHTING —S114

END

| WORK AREA ID | WORK AREA NAME | ... |
|---|---|---|
| workspace01 | workspace01 | ... |
| workspace02 | workspace02 | ... |
| ... | ... | ... |

| DOCUMENT ID | DOCUMENT NAME | X COORDINATE | Y COORDINATE | ... |
|---|---|---|---|---|
| doc001 | A-1 | 20 | 30 | ... |
| doc002 | A-2 | 70 | 30 | ... |
| doc003 | A-3 | 110 | 30 | ... |
| ... | ... | ... | ... | ... |

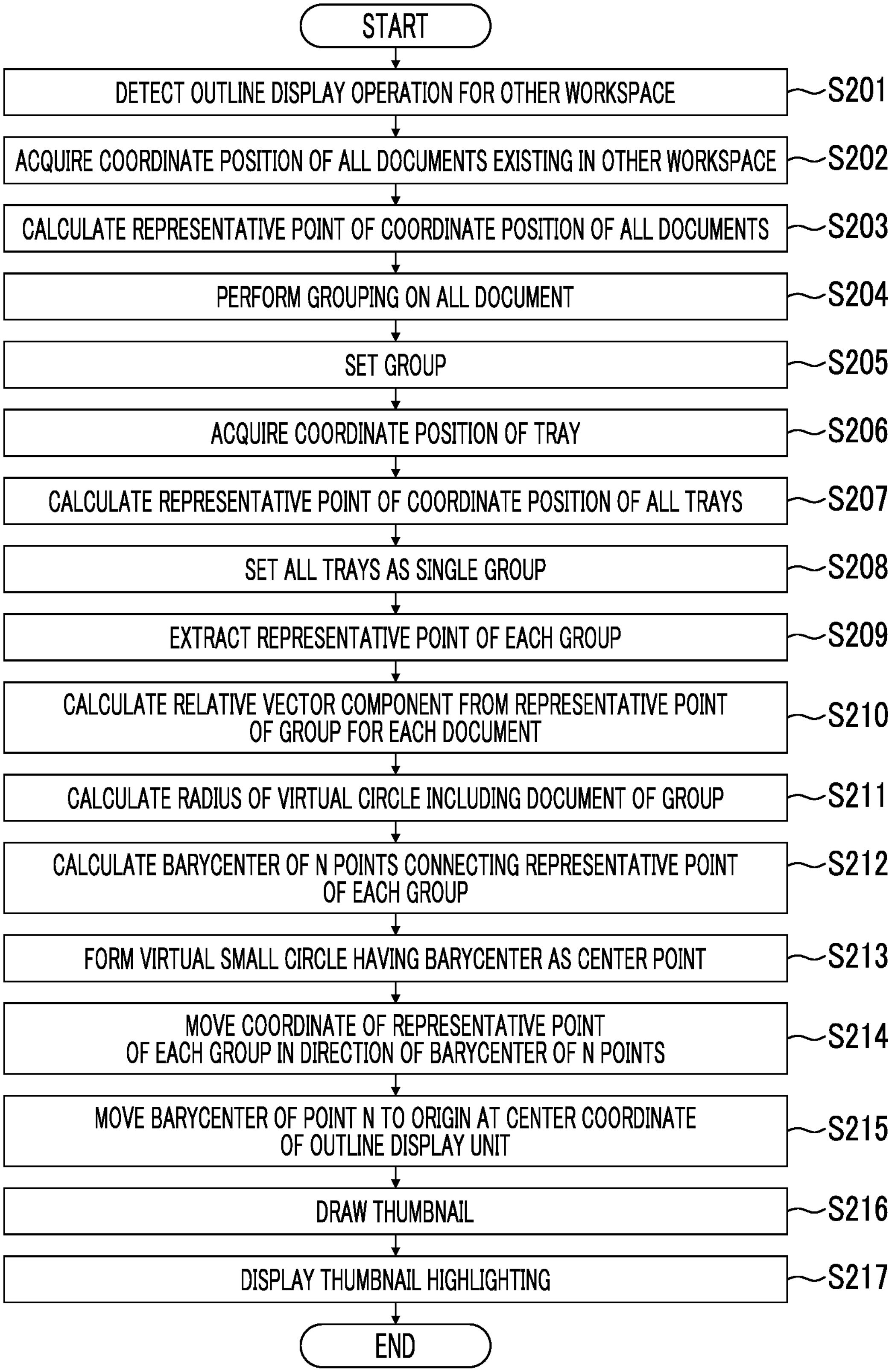

FIG. 19

START

| | |
|---|---|
| DETECT OUTLINE DISPLAY OPERATION FOR OTHER WORKSPACE | S201 |
| ACQUIRE COORDINATE POSITION OF ALL DOCUMENTS EXISTING IN OTHER WORKSPACE | S202 |
| CALCULATE REPRESENTATIVE POINT OF COORDINATE POSITION OF ALL DOCUMENTS | S203 |
| PERFORM GROUPING ON ALL DOCUMENT | S204 |
| SET GROUP | S205 |
| ACQUIRE COORDINATE POSITION OF TRAY | S206 |
| CALCULATE REPRESENTATIVE POINT OF COORDINATE POSITION OF ALL TRAYS | S207 |
| SET ALL TRAYS AS SINGLE GROUP | S208 |
| EXTRACT REPRESENTATIVE POINT OF EACH GROUP | S209 |
| CALCULATE RELATIVE VECTOR COMPONENT FROM REPRESENTATIVE POINT OF GROUP FOR EACH DOCUMENT | S210 |
| CALCULATE RADIUS OF VIRTUAL CIRCLE INCLUDING DOCUMENT OF GROUP | S211 |
| CALCULATE BARYCENTER OF N POINTS CONNECTING REPRESENTATIVE POINT OF EACH GROUP | S212 |
| FORM VIRTUAL SMALL CIRCLE HAVING BARYCENTER AS CENTER POINT | S213 |
| MOVE COORDINATE OF REPRESENTATIVE POINT OF EACH GROUP IN DIRECTION OF BARYCENTER OF N POINTS | S214 |
| MOVE BARYCENTER OF POINT N TO ORIGIN AT CENTER COORDINATE OF OUTLINE DISPLAY UNIT | S215 |
| DRAW THUMBNAIL | S216 |
| DISPLAY THUMBNAIL HIGHLIGHTING | S217 |

END

| OBJECT ID | OBJECT NAME | OBJECT TYPE | X COORDINATE | Y COORDINATE | ... |
|---|---|---|---|---|---|
| doc001 | A-1 | document | 20 | 30 | ... |
| doc002 | A-2 | document | 70 | 30 | ... |
| tray001 | TRAY 1 | tray | 73 | 233 | ... |
| ... | ... | ... | ... | ... | ... |

INFORMATION PROCESSING APPARATUS, NON-TRANSITORY COMPUTER READABLE MEDIUM STORING PROGRAM, AND INFORMATION PROCESSING METHOD FOR ARRANGING THUMBNAILS OF VARIOUS THUMBNAIL GROUPS

CROSS-REFERENCE TO RELATED APPLICATIONS

This application is based on and claims priority under 35 USC 119 from Japanese Patent Application No. 2022-052795 filed Mar. 29, 2022.

BACKGROUND

(i) Technical Field

The present invention relates to an information processing apparatus, a non-transitory computer readable medium storing a program, and an information processing method.

(ii) Related Art

For example, in JP2009-151348A, there is disclosed a document information management apparatus including a storage unit that stores document information, information on a first storage destination for storing the document information and storing first position information consisting of an arrangement position of a reference image of the document information to be stored, and information on a second storage destination for storing the document information and storing second position information consisting of an arrangement position of a reference image of the document information to be stored, a first display section that displays the reference image of the document information stored in the first storage destination in a first display window based on the first position information, a second display section that creates, in a case where the second storage destination is designated as a movement destination in a case where the reference image of the document information displayed in the first display window is selected and moved, a second display window and displays the reference image of the document information stored in the second storage destination based on the second position information, and a storage section that changes, in a case where the reference image of the selected document information is designated to move to the arrangement position in the second display window, a storage destination of the selected document information to the second storage destination, updates the second position information based on the arrangement position of the reference image of the document information moved on the display window, and stores the second position information in the storage unit.

SUMMARY

Here, in a case where a screen in which a list of thumbnails is displayed in any arrangement is attempted to be reduced in size so as to see an entirety of the screen at one view, the screen becomes too small depending on the arrangement of the thumbnails, and visibility deteriorates. On the other hand, in a case where the thumbnails are arranged so as to eliminate a wasted space, arbitrariness or degree of freedom of the arrangement may be impaired.

Aspects of non-limiting embodiments of the present disclosure relate to an information processing apparatus, a non-transitory computer readable medium storing a program, and an information processing method that suppress a decrease in degree of freedom in arrangement, as compared with a case where thumbnails are arranged in a reduction display.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a processor configured to: determine a thumbnail group to which a thumbnail as a target in a reduction display belongs by arranging the thumbnail; and perform the reduction display in a mode of arranging the thumbnail belonging to the thumbnail group and another thumbnail other than the thumbnail to be close to each other.

BRIEF DESCRIPTION OF THE DRAWINGS

Exemplary embodiment(s) of the present invention will be described in detail based on the following figures, wherein:

FIG. 7A illustrates the operation screen of the image display apparatus, and FIG. 7B illustrates an operation screen of another image display apparatus;

FIG. 8A illustrates a mouse-over state, and FIG. 8B illustrates a first mode of an outline display;

FIG. 9A illustrates a second mode of the outline display, and FIG. 9B illustrates a third mode of the outline display;

FIG. 10 is a flowchart according to the first exemplary embodiment describing a process example by an outline display processing unit;

FIG. 11A is a diagram describing step S102, and FIG. 11B is a diagram describing steps S104 and S106;

FIG. 12A is a diagram describing steps S107 to S108, and FIG. 12B is a diagram describing steps S109 to S111;

FIGS. 13A and 13B are diagrams describing step S112;

FIGS. 15A and 15B are diagrams describing information stored in a non-volatile memory of the image display apparatus, FIG. 15A illustrates work area information, and FIG. 15B illustrates document information;

FIG. 17A illustrates the operation screen of the image display apparatus, and FIG. 17B illustrates an operation screen of the other image display apparatus;

FIG. 18A illustrates a mouse-over state, and FIG. 18B illustrates a first mode of an outline display;

FIG. 19 is a flowchart according to the second exemplary embodiment describing a process example by the outline display processing unit;

FIG. 20A is a diagram describing step S202 and step S206, and FIG. 20B is a diagram describing step S204 and step S209;

FIG. 21A is a diagram describing steps S210 to S211, and FIG. 21B is a diagram describing steps S212 to S214; and FIG. 22 is a diagram illustrating object information stored in a non-volatile memory of the image display apparatus.

DETAILED DESCRIPTION

Hereinafter, exemplary embodiments of the present invention will be described in detail with reference to drawings.

Figure 1:
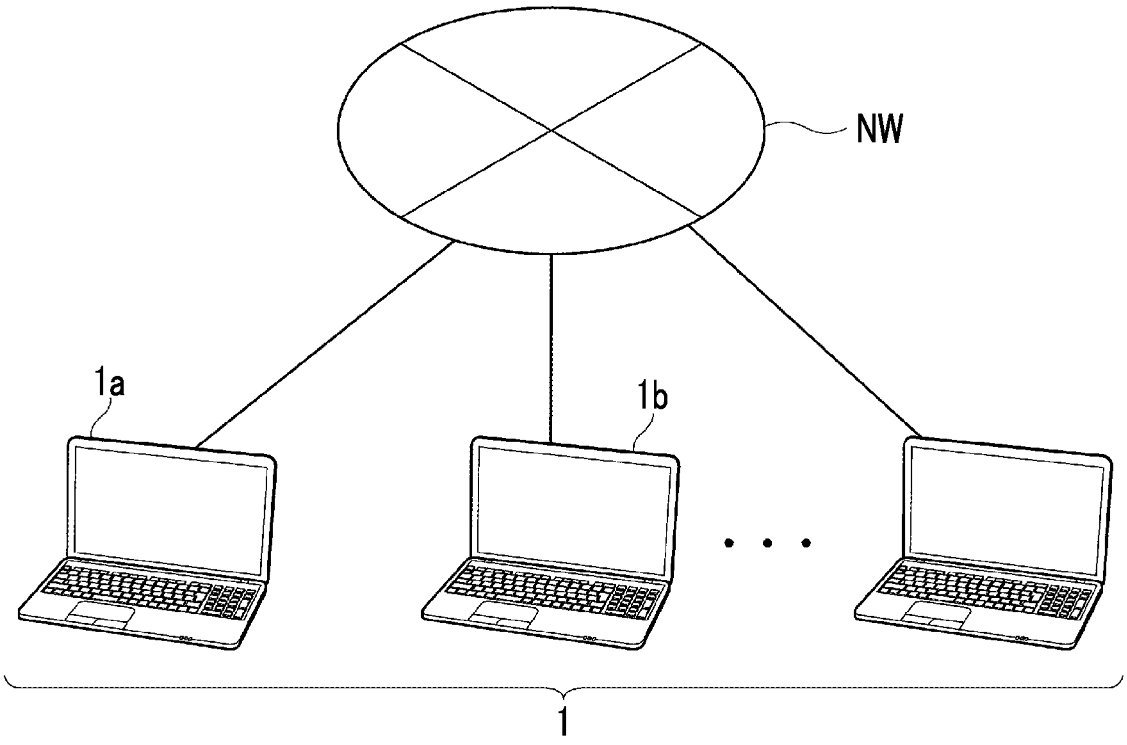
FIG. 1 is a diagram illustrating an overall configuration example of an information processing system to which the present exemplary embodiment is applied.

FIG. 1 is a diagram illustrating an overall configuration example of an information processing system 1 to which the present exemplary embodiment is applied.

The information processing system 1 according to the present exemplary embodiment is configured by connecting an image display apparatus 1*a*, an image display apparatus 1*b*, and the like used by a user to browse a file via a communication line NW.

The communication line NW is, for example, a line such as a local area network (LAN) or the Internet, and is used for information communication between the image display apparatus 1*a* and the image display apparatus 1*b*. Meanwhile, the network may be a composite type configuration of the LAN and the Internet.

The information processing system 1 according to the present exemplary embodiment is for browsing and editing files on the image display apparatuses 1*a* and 1*b*. The image display apparatuses 1*a* and 1*b* are examples of information processing apparatuses.

In the present exemplary embodiment, the "file" is an electronic file stored in the image display apparatuses 1*a*, 1*b*, and the like.

The file may include an image in addition to a text, or may include only the image without including the text. In addition, the file may include not only document data and image data, but also information to be used in a case where the document data is converted into an image, or attribute information such as an update date and time of the file, a paper size, the number of pages, and keywords in the file.

The image display apparatuses 1*a* and 1*b* are apparatuses for browsing and editing files. The image display apparatuses 1*a* and 1*b* have a display unit that displays an image corresponding to the file. The image display apparatuses 1*a* and 1*b* include a computer apparatus. A form of the image display apparatuses 1*a* and 1*b* includes, for example, a desktop personal computer, a notebook personal computer, a tablet-type information terminal, a smartphone, a game device, and the like.

Hardware Configuration of Image Display Apparatuses 1*a* and 1*b*

Figure 2:
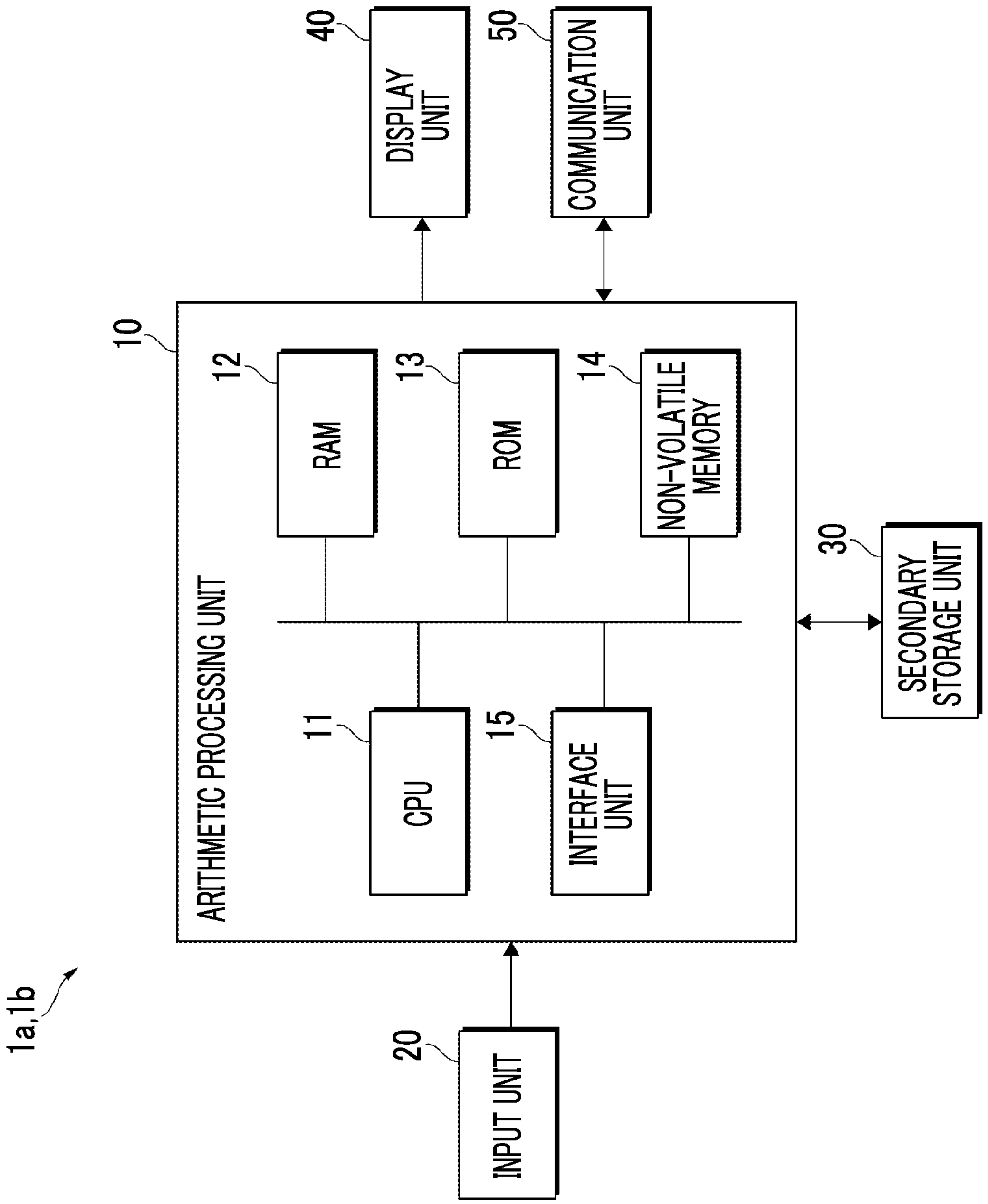
FIG. 2 is a diagram illustrating a hardware configuration example of an image display apparatus to which the present exemplary embodiment is applied.

FIG. 2 is a diagram illustrating a hardware configuration example of the image display apparatuses 1*a* and 1*b* to which the present exemplary embodiment is applied.

As illustrated in FIG. 2, the image display apparatuses 1*a* and 1*b* according to the present exemplary embodiment include an arithmetic processing unit 10 that executes a digital arithmetic process according to a predetermined processing program in a case of displaying a screen, an input unit 20 that accepts an input operation from a user, and a secondary storage unit 30 that is realized by a hard disk drive (HDD). Further, the image display apparatuses 1*a* and 1*b* include a display unit 40 consisting of a liquid crystal display panel or an organic electro luminescence (EL) display panel for displaying an image, a text information, or the like to the user, and a communication unit 50 that transmit and receive data via a network.

The arithmetic processing unit 10 includes a central processing unit (CPU) 11 that controls the entire apparatus, as an example of a processor, a random access memory (RAM) 12 to be used as a working memory of the CPU 11, and a read only memory (ROM) 13 that stores an image display processing program or the like to be executed by the CPU 11. In addition, the arithmetic processing unit 10 includes a non-volatile memory 14 such as a static RAM (SRAM,) a flash memory, or the like backed up by battery, that is rewritable and can hold data even in a case where power supply is interrupted, and an interface unit 15 that controls each unit such as the input unit 20 connected to the arithmetic processing unit 10. A document or image information such as thumbnail information displayed on the display unit 40 is stored in the non-volatile memory 14.

The input unit 20 is an apparatus such as a pointing device by which the user inputs an operation.

For example, in a case where the input unit 20 is a mouse or the like, the user can designate a position on a screen of the display unit 40, a displayed image, or the like by performing a cursor movement operation or a click operation.

Further, in a case where the input unit 20 is a touch panel or the like, the user can designate a position on a screen or a displayed image by performing an operation of touching the touch panel with a finger or the like or an operation of maintaining the touched state of the finger or the like for a longer time than a predetermined time. In this case, the input unit 20 is provided integrally with the display unit 40.

In addition to the apparatus such as the pointing device described above, a keyboard or the like for performing a key input operation may be provided as the input unit 20.

In addition to storing image data and the like, the secondary storage unit 30 also stores an image display processing program to be executed by the arithmetic processing unit 10, and the arithmetic processing unit 10 reads the image display processing program to execute each process of the image display apparatuses 1*a* and 1*b* according to the present exemplary embodiment.

The display unit 40 displays, for example, office documents created by office software or other application programs, and thumbnail information that is highly convenient for managing a plurality of application files, image files, or the like is used.

This thumbnail information is a reduced image for displaying a list of the files, and contents can be approximatively grasped without opening the file.

In a case where such a file is configured with a plurality of pages, in addition to a reduction display mode that contents of only a page at a head or a representative page can be approximatively grasped, another reduction display mode may be displayed in which all the pages are separated to be distinguished for each page and contents of each page can be approximatively grasped. Further, the thumbnail image may be displayed in a mode in which an image is enlarged and displayed on the display unit 40 without opening the file by an operation of the user. The image of this mode is referred to as an "enlarged thumbnail image", and displaying the enlarged thumbnail image is referred to as an "enlarged display", in some cases.

The file may have a single page structure or a page structure in which a plurality of pages are bundled.

Here, the program executed by the CPU 11 is provided to the arithmetic processing unit 10 in a state of being stored in a computer-readable recording medium such as a magnetic recording medium (for example, a magnetic tape, a magnetic disk, or the like), an optical recording medium (for example, an optical disk, or the like), an optical magnetic recording medium, a semiconductor memory, or the like. Further, the program executed by the CPU 11 may be downloaded to the image display apparatuses 1*a* and 1*b* by using communication means such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The image display apparatuses 1*a* and 1*b* may be connected to another apparatus via a network. As a result, documents and the like created by the other apparatus and transferred by the network are displayed on the image display apparatuses 1*a* and 1*b*. For example, in a case where a certain business is configured with a plurality of documents such as a development specification and a business purchase order, these plurality of documents are displayed on the image display apparatuses 1*a* and 1*b*. Further, work of turning each page to a different related department and finally bundling and completing the pages as one document is performed by the image display apparatuses 1*a* and 1*b*, and further, for example, work such as approval is performed.

Such a network uses a local area network (LAN) or the Internet, and may be a composite type configuration of the LAN and the Internet.

First Exemplary Embodiment

Next, the image display apparatuses 1*a* and 1*b* according to a first exemplary embodiment will be described.

Figure 3:
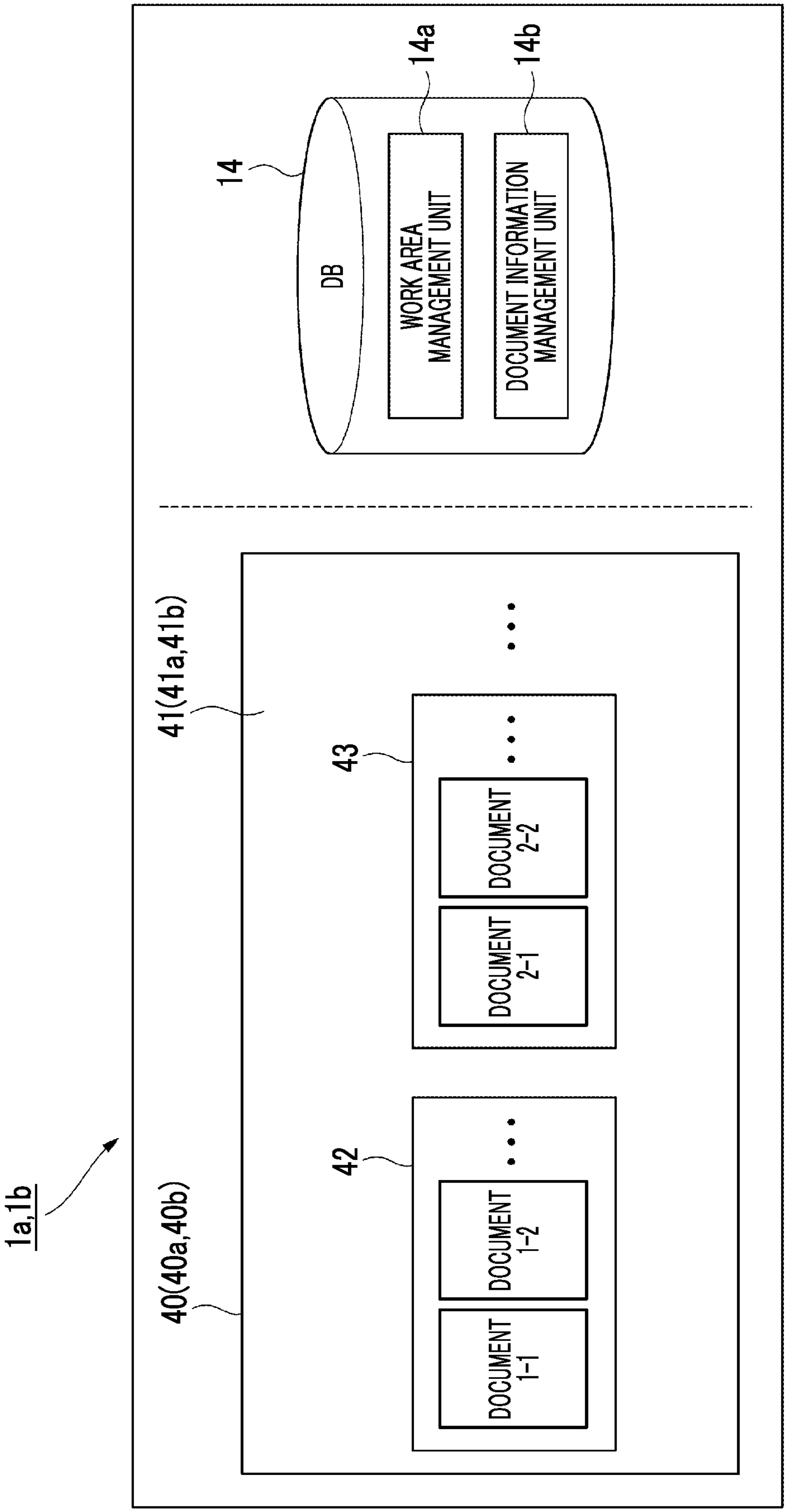
FIG. 3 is a diagram illustrating a configuration example of an image display apparatus according to a first exemplary embodiment.

FIG. 3 is a diagram illustrating a configuration example of the image display apparatuses 1*a* and 1*b* according to the first exemplary embodiment.

As illustrated in FIG. 3, workspaces 41*a* and 41*b* (hereinafter, may be referred to as a workspace 41) as personal workspaces are set in a display unit 40*a* of the image display apparatus 1*a* and a display unit 40*b* of the image display apparatus 1*b* (hereinafter, may be referred to as the display unit 40). The workspace 41 is realized by file handling software using the RAM 12 (see FIG. 2).

Thumbnail information associated with a document is displayed in the workspace 41 at any coordinate position. Further, the workspace 41 is a workspace of a user in which the coordinate position of the thumbnail information can be moved and the document can be previewed, copied, deleted, and the like.

The document referred to here is a substance of the document (original content data). As described above, although the thumbnail information and the like associated with the document are displayed in the workspace 41, a word of "thumbnail" or "document" may be used for description, instead of the "thumbnail information".

The work areas 42 and 43 arranged in the workspace 41 are areas (workspaces) for working on a document moved by dragging and dropping with a mouse operation, a taking-all-out operation, or the like on the document selected on an inbox (not illustrated). In the example illustrated in FIG. 3, a document 1-1 and a document 1-2 are stored in the work area 42, and a document 2-1 and a document 2-2 are stored in the work area 43, as thumbnail information.

The inbox (not illustrated) has a function of receiving a plurality of documents from any other user, and is a storage area in which the documents received from the other users can be temporarily stored.

Further, a work area management unit 14*a* is set in a database as the non-volatile memory 14 of the image display apparatuses 1*a* and 1*b*. The work area management unit 14*a* has work area information such as a work area ID and a work area name (see, for example, reference numeral 14*c* in FIG. 15A).

Further, a document information management unit 14*b* is set in the database. The document information management unit 14*b* has a function of managing document information (for example, refer to reference numeral 14*d* in FIG. 15B), which is attribute information attached to a substance of the document. The attribute information includes, for example, a creator ID, a document type, a case number, and the like, in addition to a document ID, a document name, a coordinate position (X coordinate value and Y coordinate value) on the workspace 41.

Figure 4:
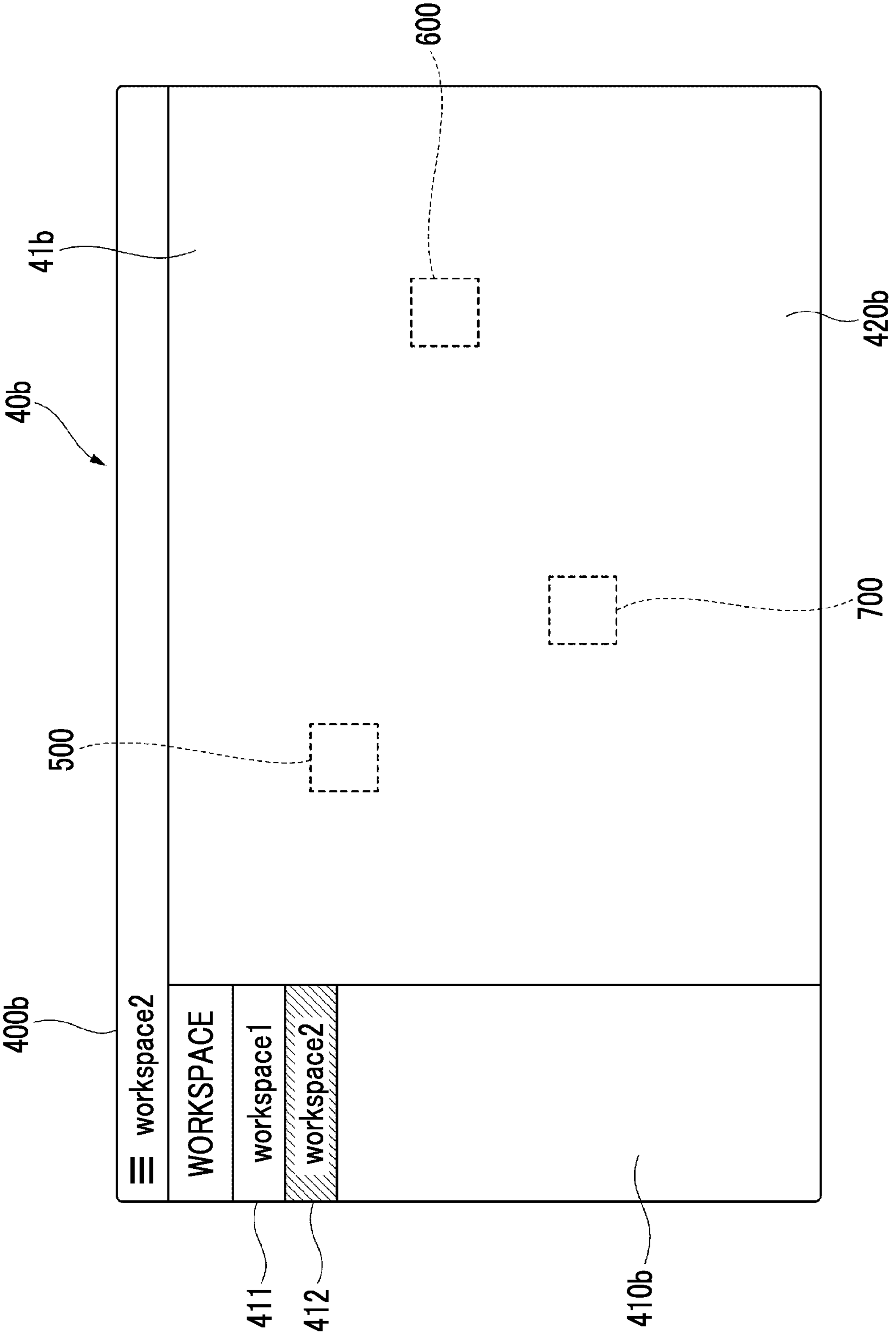
FIG. 4 is a diagram illustrating a configuration example of an operation screen displayed on a display unit.

FIG. 4 is a diagram illustrating a configuration example of an operation screen 400*b* displayed on the display unit 40*b*.

The display unit 40*b* is provided in the image display apparatus 1*b* (see FIG. 1), and displays the operation screen 400*b* illustrated in FIG. 4. The operation screen 400*b* is the workspace 41*b* on file handling software.

The file handling software is software that digitizes and manages files such as image data or document data, and has a function of promoting unified management for paper files and electronic files.

On the operation screen 400*b*, a workspace list display unit 410*b* and a workspace display unit 420*b* are displayed.

The workspace list display unit 410*b* of the operation screen 400*b* displays a list of workspaces accessible by a logged-in user. In the example illustrated in FIG. 4, the workspace list display unit 410*b* displays a list of an item 411 indicating "workspace1" as a workspace and an item 412 indicating "workspace2". The "workspace1" is a workspace of the image display apparatus 1*a*, and the "workspace2" is a workspace of the image display apparatus 1*b*.

A state illustrated in FIG. 4 is a state in which the item 412 illustrated with hatching is selected, and documents 500, 600, and 700 illustrated by broken lines are displayed in the "workspace2". The documents 500, 600, and 700 illustrated by the broken lines indicate arrangement positions of thumbnail information, and indicate, for example, a user area which is an area set for each user with which a plurality of documents to be edited by the user are arranged, in some cases.

For example, in a case where the item 411 is selected by a mouse operation, an image or the like for confirming whether or not to switch to the "workspace1" is displayed, and by performing an operation on the confirmation, the workspace display unit 420*b* is switched into a thumbnail information display for the "workspace1". Further, in a case where item 412 is selected by a mouse operation, an image or the like for confirming whether or not to switch to the "workspace2" is displayed, and by performing an operation on the confirmation, the workspace display unit 420*b* is switched into a thumbnail information display for the "workspace2".

More specifically, in the present exemplary embodiment, for example, in a case where a user operation of mouse-over for the item 411 is detected in a state in which the item 412 is selected, an outline display of the "workspace1" is added to the workspace display unit 420*b* without starting a new program. Details will be described later.

Here, the documents 500, 600, and 700 as thumbnail information are arranged at any locations (coordinates) in the "workspace2", and the "workspace2" is used as a shared workspace (work area).

More specifically, the documents 500, 600, and 700 are arranged in a classified manner to be visually distinguishable for each user. That is, in the "workspace2", the work areas are organized such as an area in which the document 500 is disposed, an area in which the document 600 is disposed, and an area in which the document 700 is disposed. For example, the area of the document 500 is allocated as a user area (work area) for a user A, the area of the document 600 is allocated as a user area (work area) for a user B, and the area of the document 700 (work area) is allocated as a user area for a user C.

The documents 500, 600, and 700 as thumbnail information are images that enable to grasp outlines of the documents before the documents or the files are opened, and are display targets. Further, the documents 500, 600, and 700 are images for grasping contents of the file managed by the file handling software, and information that can smoothly proceed business of the user is displayed.

In the present exemplary embodiment, the documents 500, 600, and 700 function as icons for opening the corresponding documents. For example, by performing a specific operation such as a double-click operation on the documents 500, 600, and 700, the corresponding document is opened.

Functional Configuration of Image Display Apparatuses 1*a* and 1*b*

Next, a functional configuration of the image display apparatuses 1*a* and 1*b* will be described.

Figure 5:
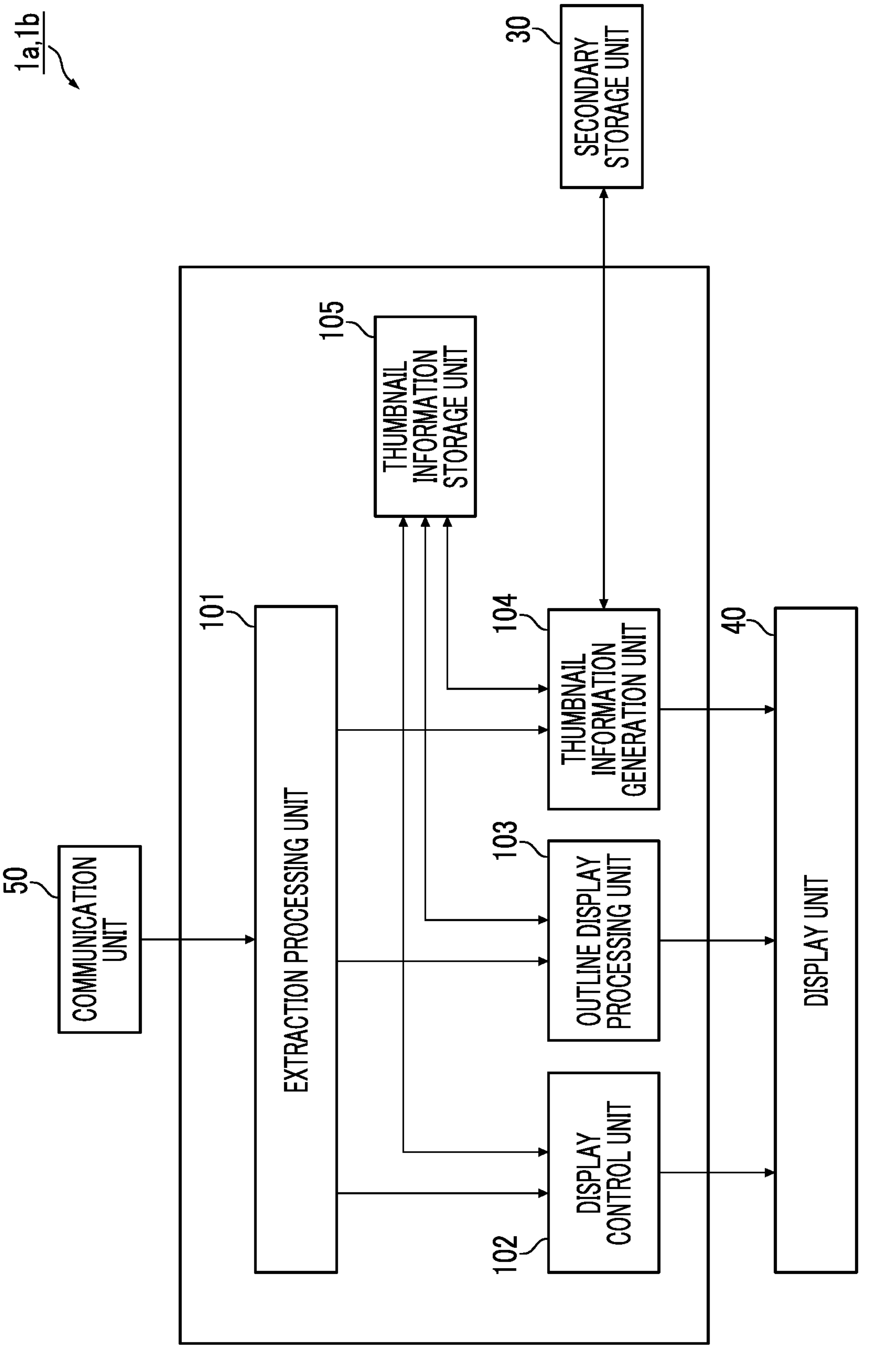
FIG. 5 is a block diagram illustrating a functional configuration example of the image display apparatus.
Figure 6:
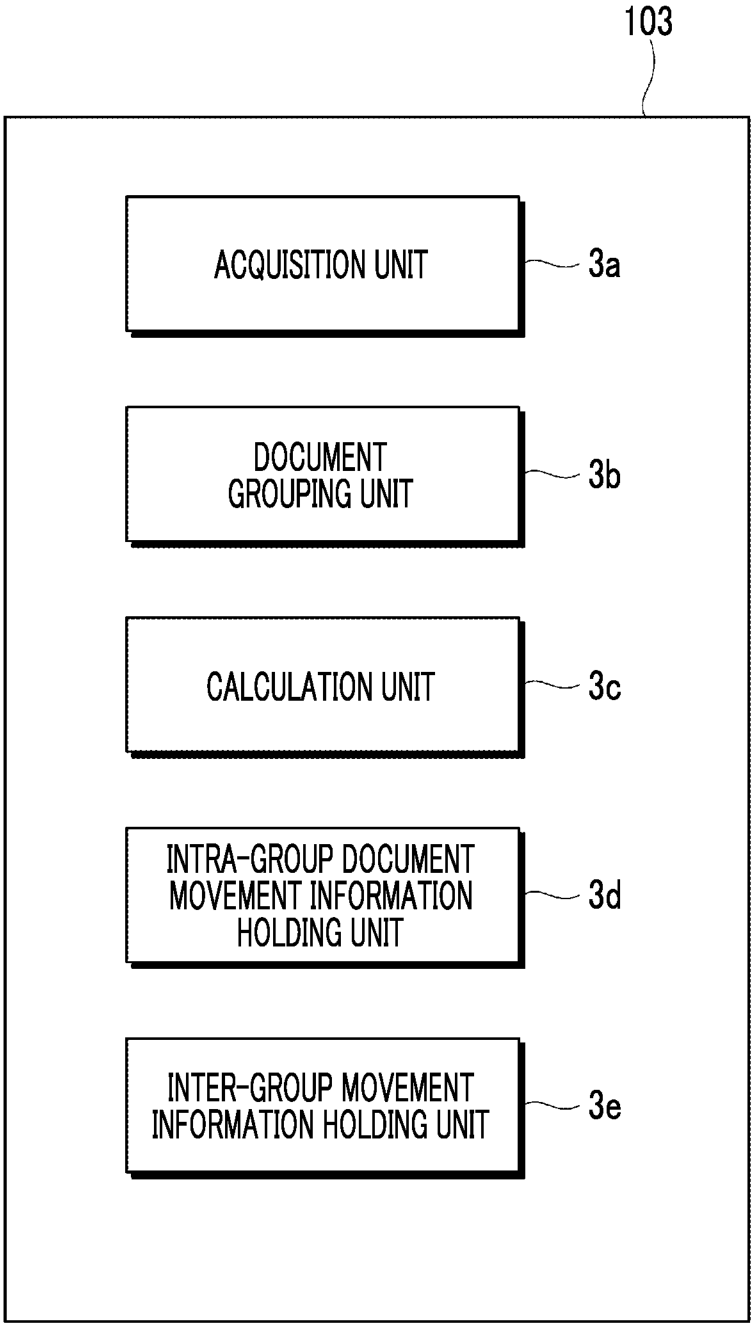
FIG. 6 is a block diagram illustrating another functional configuration example of the image display apparatus.

FIGS. 5 and 6 are block diagrams illustrating a functional configuration example of the image display apparatuses 1*a* and 1*b*.

As illustrated in FIG. 5, the image display apparatuses 1*a* and 1*b* include an extraction processing unit 101, a display control unit 102, an outline display processing unit 103, a thumbnail information generation unit 104, and a thumbnail information storage unit 105, which are realized by the arithmetic processing unit 10 (see FIG. 1).

The extraction processing unit 101 performs a document extraction process from an inbox (not illustrated). That is, the extraction processing unit 101 moves a document as thumbnail information to, for example, the workspace display unit 420*b* (see FIG. 4), and at that time, determines a coordinate position of the workspace display unit 420*b* in which the document as thumbnail information is disposed.

The display control unit 102 arranges the thumbnail information in the workspace display unit 420*b*, based on the coordinate position determined by the extraction processing unit 101. In a case where the display control unit 102 is used as a shared workspace, the thumbnail information may be automatically arranged in a predetermined area for each user.

More specifically, as illustrated in FIG. 6, the outline display processing unit 103 illustrated in FIG. 5 includes an acquisition unit 3*a*, a document grouping unit 3*b*, a calculation unit 3*c*, an intra-group document movement information holding unit 3*d*, and an inter-group movement information holding unit 3*e*.

The acquisition unit 3*a* acquires the above-described work area information included by the work area management unit 14*a* (see FIG. 3) of the non-volatile memory 14 and the above-described document information included by the document information management unit 14*b* (see FIG. 3). Further, the acquisition unit 3*a* detects that an operation for instructing an outline display (outline display operation) is performed.

The document grouping unit 3*b* performs grouping in the workspaces 41*a* and 41*b*, based on position information of a plurality of documents. For example, in a case where the workspaces 41*a* and 41*b* are used as shared workspaces, the documents for each user are distinguished by grouping.

The calculation unit 3*c* uses the information acquired by the acquisition unit 3*a* and the grouping result by the document grouping unit 3*b* to calculate a representative point of each group, a radius of a virtual circle including the documents of each group, and the like.

The intra-group document movement information holding unit 3*d* holds movement information in a case where each document in the group is moved with the outline display, in each group grouped by the document grouping unit 3*b*. This intra-group document movement information is calculated by the calculation unit 3*c* described above.

The inter-group movement information holding unit 3*e* holds movement information in a case where each group is moved with the outline display, with the group grouped by the document grouping unit 3*b* as a unit. This inter-group document movement information is calculated by the calculation unit 3*c* described above.

Here, the outline display described above will be described with reference to FIGS. 7A to 9B. That is, a case of an outline display will be described with reference to FIGS. 7A, 7B, and 8A, and a first mode of the outline display illustrated in FIG. 8B, a second mode of the outline display illustrated in FIG. 9A, and a third mode of the outline display illustrated in FIG. 9B will be described.

The following description is for a case where a document of the operation screen 400*b* of the image display apparatus 1*b* is outline-displayed on the operation screen 400*a* in a case where a document as thumbnail information is displayed on the operation screen 400*a* of the image display apparatus 1*a*.

Figure 7A:
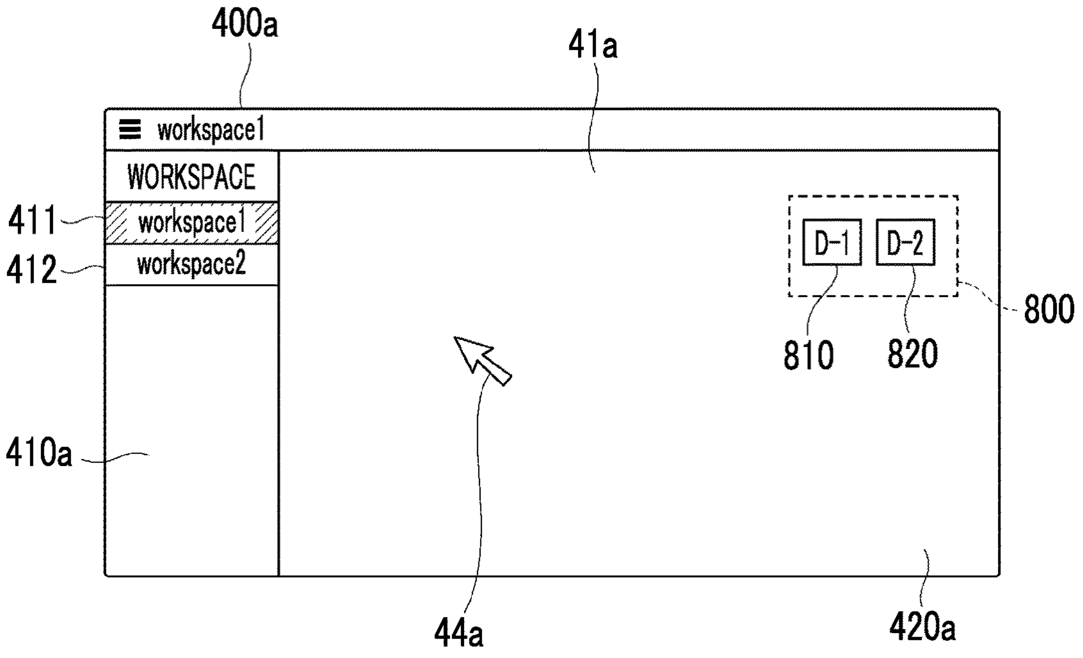
FIGS. 7A and 7B are diagrams describing an operation screen of the image display apparatus.
Figure 7B:
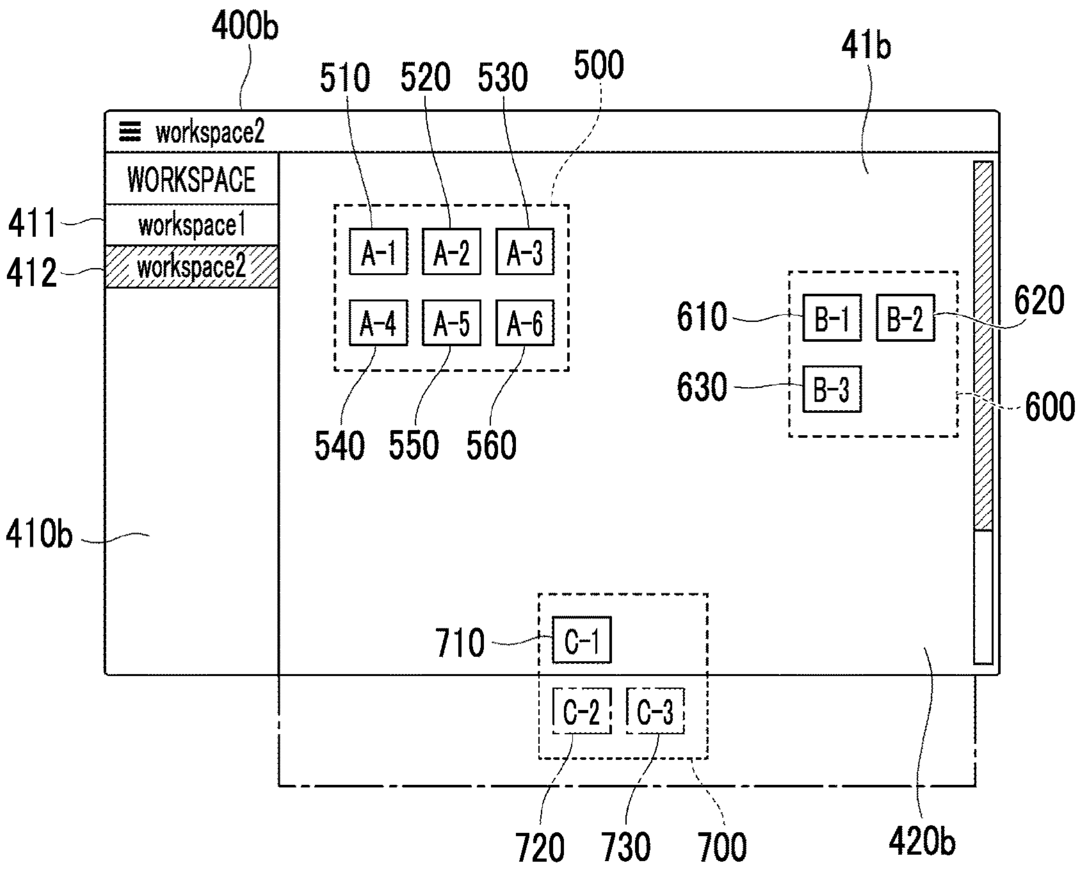
Figure 8A:
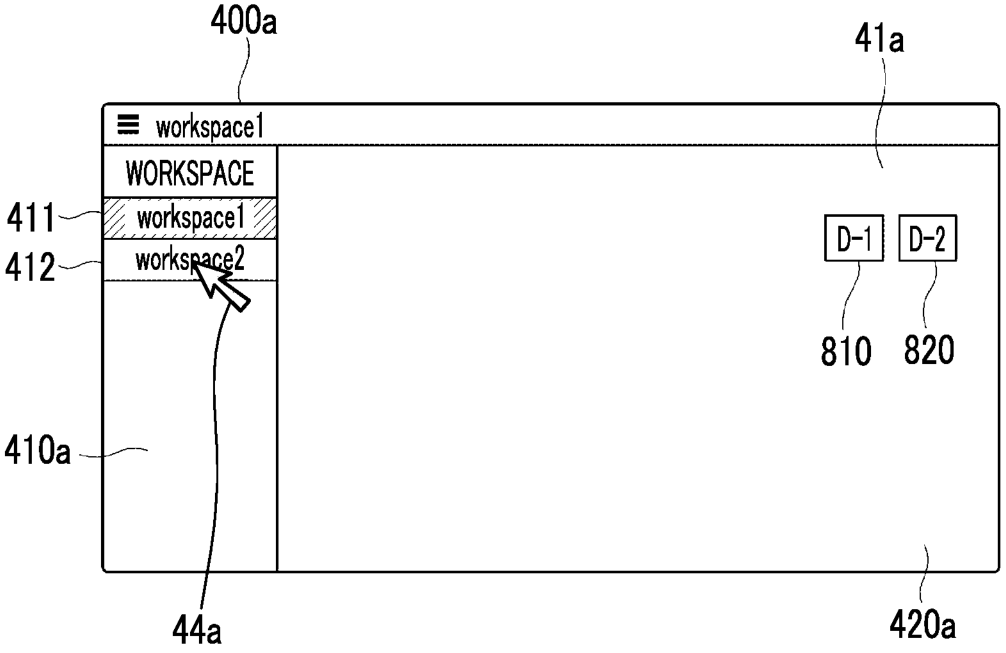
FIGS. 8A and 8B are diagrams describing the operation screen of the other image display apparatus.
Figure 8B:
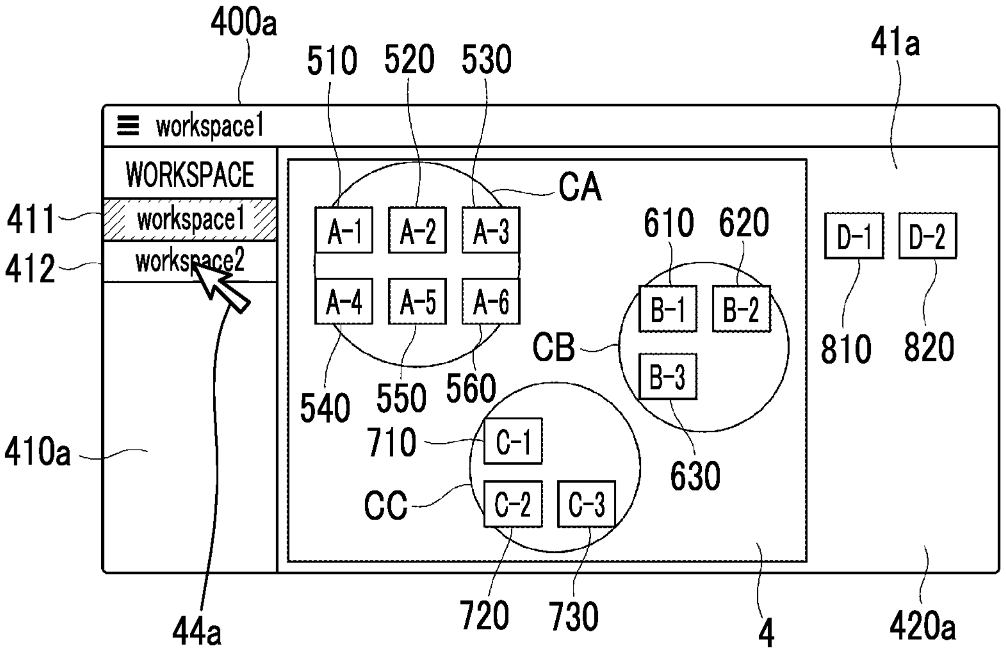

FIGS. 7A and 7B are diagrams describing the operation screens 400*a* and 400*b* of the image display apparatuses 1*a* and 1*b*, FIG. 7A illustrates the operation screen 400*a* of the image display apparatus 1*a*, and FIG. 7B illustrates the operation screen 400*b* of the image display apparatus 1*b*. FIGS. 8A and 8B are diagrams describing the operation screen 400*a* of the image display apparatus 1*a*, FIG. 8A illustrates a mouse-over state, and FIG. 8B illustrates the first mode of the outline display.

The operation screens 400*a* illustrated in FIGS. 7A, 8A, and 8B are for the "workspace1" as illustrated in an upper left corner, and the operation screen 400*b* illustrated in FIG. 7B is for the "workspace2" as illustrated in an upper left corner.

The operation screen 400*a* illustrated in FIG. 7A illustrates the workspace 41*a* of the image display apparatus 1*a* (see FIG. 1), and in the workspace display unit 420*a*, a document 810 of "D-1" and a document 820 of "D-2" are arranged in an area of the document 800 in an upper right corner.

More specifically, an area on a left side from a center of the workspace 41*a* in a right-left direction is an empty area in which no document is arranged. The outline display unit 4, which will be described later, is displayed by using this free area. For example, in a case where the area of the document 800 is a center of the workspace display unit 420*a*, the area of the document 800 may be displayed at a position in the upper right corner, for example, in a case where the outline display unit 4, which will be described later, is displayed.

The operation screen 400*b* illustrated in FIG. 7B illustrates the workspace 41*b* of the image display apparatus 1*b* (see FIG. 1), and in the workspace display unit 420*b*, a document 510 of "A-1", a document 520 of "A-2", a document 530 of "A-3", a document 540 of "A-4", a document 550 of "A-5", and a document 560 of "A-6" are arranged in an area of the document 500 in the upper left corner.

Further, in the workspace display unit 420*b*, a document 610 of "B-1", a document 620 of "B-2", and a document 630 of "B-3" are arranged in an area of the document 600 located on a right side, and a document 710 of "C-1", a document 720 of "C-2", and a document 730 of "C-3" are arranged in an area of the document 700 on a center downside.

The area of the document 500, the area of the document 600, and the area of the document 700 are located apart from each other, and have a distance as compared to a mutual interval of the document 510 and the like in each area of the documents 500, 600, and 700, and the document 510 and the like are organized in the workspace display unit 420*b*.

More specifically, in the workspace display unit 420*b* illustrated in FIG. 7B, a slide bar is displayed on a right side, and a part of the workspace 41*b* is displayed. Specifically, the area of the document 500 and the area of the document 600 are all displayed, but the area of the document 700 is not all displayed. More specifically, an upper portion of the area of document 700, that is, only the document 710, is displayed, and the remaining portion, that is, the documents 720 and 730, is not displayed on the workspace display unit 420*b*. The documents 720 and 730 are displayed on the workspace display unit 420*b* by moving the slide bar downward.

Here, in the workspace list display unit 410*a* illustrated in FIG. 7A, the item 411 is in a selected state, and in the workspace list display unit 410*b* illustrated in FIG. 7B, the item 412 is in the selected state.

As illustrated in FIG. 8A, in a case where mouse-over of overlapping a cursor 44*a* on the item 412 of the workspace list display unit 410*a* is performed in the operation screen 400*a*, the outline display unit 4 is displayed in the workspace 41*a*, as illustrated in FIG. 8B. The outline display unit 4 is arranged in a fitted manner in the workspace display unit 420*a* together with the document 810 of "D-1" and the document 820 of "D-2".

In a case where the cursor 44*a* is removed from the item 412 and the mouse-over is not performed, the outline display unit 4 is not displayed. Meanwhile, even in a case where the mouse-over is not performed, it is also conceivable to keep a state in which the outline display unit 4 is displayed until a predetermined operation is performed.

The modes of the outline display described above will be described.

As the first mode of the outline display, the outline display unit 4 illustrated in FIG. 8B displays the entire workspace 41*b* illustrated in FIG. 7B. That is, the workspace 41*a* illustrated in FIG. 7A is displayed on the outline display unit 4 such that the entire document including the documents 720 and 730, that cannot be seen without moving the slide bar, can be seen at one view.

More specifically, the area of the document 500, the area of the document 600, and the area of the document 700 are arranged such that a distance between the areas are close to each other. That is, the areas are arranged to be close to each other. In this manner, positions are adjusted such that each area is efficiently displayed. On the other hand, a relative position relationship between the documents 510 to 560 in the area of the document 500 is maintained, a relative position relationship between the documents 610 to 630 in the area of the document 600 is maintained, and a relative position relationship between the documents 710 to 730 in the area of the document 700 is maintained. In this manner, consistency in the outline display unit 4 is enhanced.

For example, as long as the relative positional relationship between the documents 510 to 560 in the area of the document 500 is maintained, a distance between the documents 510 to 560 may not be changed, and the distance may be shortened.

In addition, a size of the document 510 or the like in the outline display unit 4 has the same manner as the case of the workspace 41*b* illustrated in FIG. 7B. Even in a case where the size of the document 510 or the like in the outline display unit 4 is reduced as compared with the case of the workspace 41*b*, it is suppressed that a reduction ratio becomes small.

Further, in the first mode illustrated in FIG. 8B, an image CA of a circular portion indicating the area of the document 500, an image CB of a circular portion indicating the area of the document 600, and an image CC of the circular portion indicating the area of the document 700 are displayed in the outline display unit 4. Such images CA, CB, and CC are not displayed in the workspace 41*b* illustrated in FIG. 7B. Therefore, it becomes easier to recognize which area a plurality of documents 510 and the like belong to, and it becomes easier to recognize and visibility in the outline display unit 4 is enhanced.

Further, in the first mode illustrated in FIG. 8B, sizes of the circular images CA, CB, and CC are set such that at least a part of the document is included in the circle. Therefore, the visibility is ensured. The entire document may be included in the circle.

In addition, the size of the image CA is larger than the sizes of the images CB and CC. This is because the size is determined according to the number of included documents. Meanwhile, in a case where the documents are relatively separated from each other, the number of documents may be small or a large circular shape may be set.

It is also conceivable that the images CA, CB, and CC are made into a figure other than a circle, for example, an elliptical shape or a square shape.

Furthermore, in the first mode illustrated in FIG. 8B, the images CA, CB, and CC are illustrated by lines indicating only the outer shape, and the present exemplary embodiment is not limited to this, and an inside of the circle may be colored. In that case, for example, a relative position in a vertical direction of a paper plane may be set such that the documents 510 to 560 are displayed with priority over the images CA, CB, and CC. Further, in a case of coloring the inside of the circle of the images CA, CB, and CC, the same color may be used, or the colors may be different from each other.

Figure 9A:
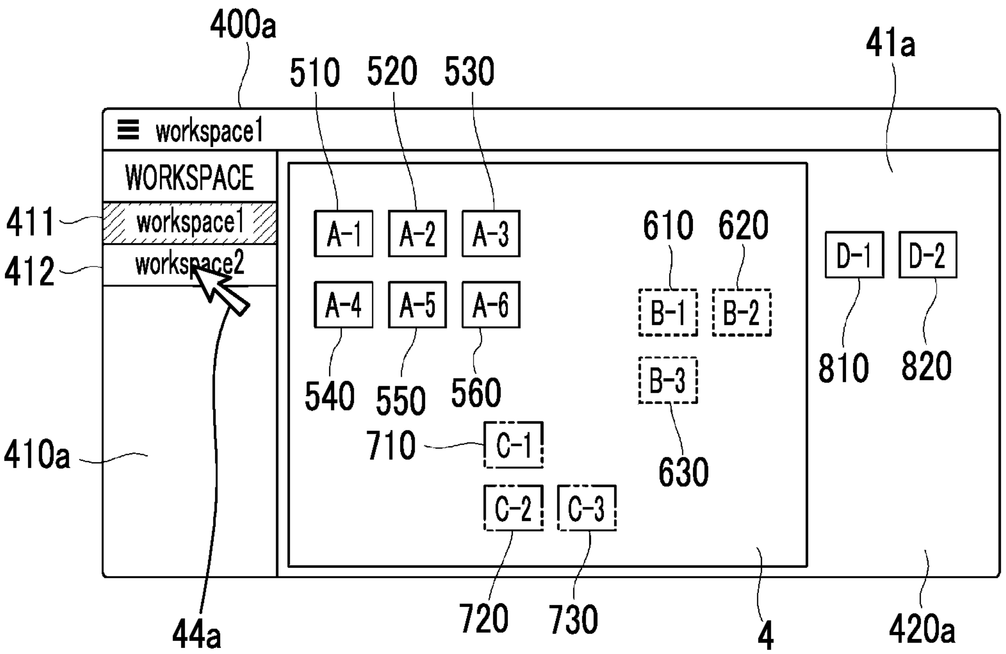
FIGS. 9A and 9B are diagrams describing the operation screen of the other image display apparatus.
Figure 9B:
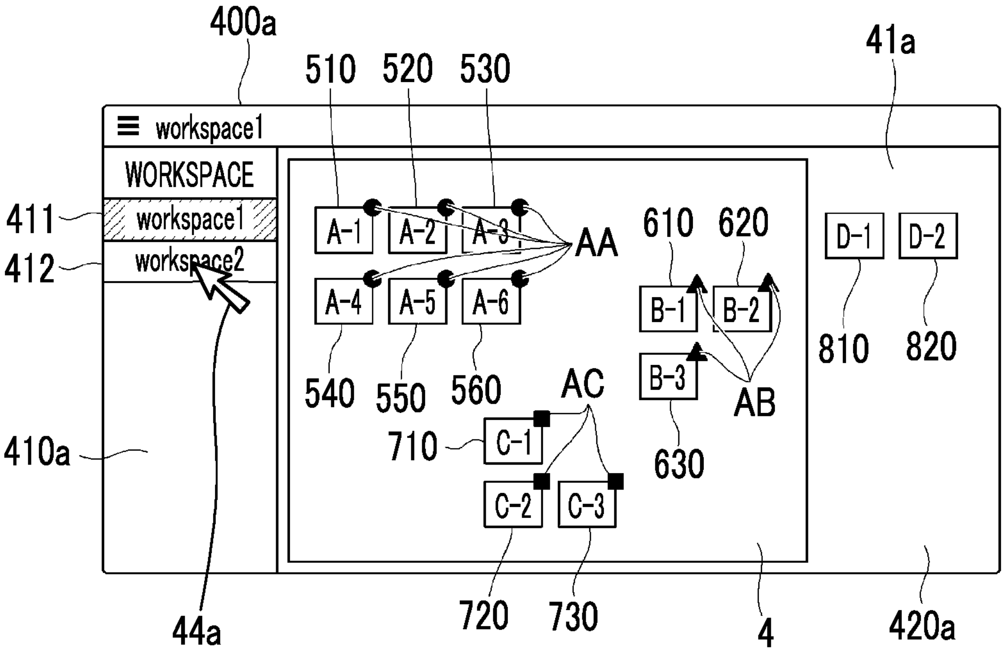

FIGS. 9A and 9B are diagrams describing the operation screen 400*a* of the image display apparatus 1*a*, FIG. 9A illustrates a second mode of the outline display, and FIG. 9B illustrates a third mode of the outline display.

As the second mode of the outline display, the outline display unit 4 illustrated in FIG. 9A changes a line type of each borderline of the documents 510 to 560 located in the area of the document 500, the documents 610 to 630 located in the area of the document 600, and the documents 710 to 730 located in the area of the document 700. That is, the documents 510 to 560 are indicated by solid lines, the documents 610 to 630 are indicated by broken lines, and the documents 710 to 730 are indicated by two-dot chain lines.

The second mode is to change a display method of a thumbnail illustrating the document. For example, in addition to a case where the line type of the borderline of the thumbnail is changed, a color of the borderline may be changed. As an example, the borderlines of documents 510 to 560 are illustrated in blue, the borderlines of documents 610 to 630 are illustrated in purple, and the borderlines of documents 710 to 730 are illustrated in green.

In this manner, with the second mode, the visibility can be improved in a case where the number of documents is large as compared with the first mode (FIG. 8B) using the circular images CA, CB, and CC in that another image is not added.

The document arrangement in the outline display unit 4 of the second mode has the same manner as the case of the first mode described above, and the description thereof will be omitted, including a modification example.

As the third mode of the outline display, in the outline display unit 4 illustrated in FIG. 9B, an icon AA is added to the documents 510 to 560 located in the area of the document 500, an icon AB is added to the documents 610 to 630 located in the area of the document 600, and an icon AC is added to the documents 710 to 730 located in the area of the document 700.

Shapes of the icons AA, AB, and AC are different from each other, the icon AA has a circular shape, the icon AB has a triangular shape, and the icon AC has a square shape.

In this manner, with the third mode, the visibility can be improved in a case where the number of documents is large as compared with the first mode (FIG. 8B) using the circular images CA, CB, and CC in that another image is not added. Further, in the third mode, by adding another image to each document, the visibility can be improved as compared with the second mode in which the image is distinguished and displayed in a frame of the document.

In the third mode, the icons AA, AB, and AC with respect to the document are located at an upper right corner portion, and this is an example. The positions may be another corner, for example, a center position of an upper side. Further, by painting the inside of the icons AA, AB, and AC, the visibility is enhanced.

The document arrangement in the outline display unit 4 of the third mode has the same manner as the case of the first mode described above, and the description thereof will be omitted, including a modification example.

In addition, a combination of a plurality of the first, second, and third modes described above may be applied to the outline display unit 4. For example, it is conceivable to combine the addition of the images CA, CB, and CC of the first mode (see FIG. 8B) and the display change of the thumbnail of the second mode (see FIG. 9A), or to combine the display change of the thumbnail of the second mode (see FIG. 9A) and the addition of the icons AA, AB, and AC of the third mode (see FIG. 9B).

Here, in the outline display unit 4 (see FIGS. 8B, 9A, and 9B), for example, the documents 510 to 560 are displayed in the mode indicating a group A to which the documents 510 to 560 belong, and such a display is an example of being displayed in a mode indicating a thumbnail group to which the thumbnails belongs.

In such a case, the image CA (see FIG. 8B) added to the outline display unit 4 is an area including at least some of the documents 510 to 560 belonging to the group A, and an example of an area including at least a part of the thumbnail belonging to the thumbnail group. Further, the image CA for the group A, the image CB for the group B, and the image CC for the group C can be distinguished for each of the group A, the group B, and the group C by adding a color or a pattern, and the images CA, CB, and CC are examples of areas to be added. The images CA, CB, and CC may be colored differently for each of the groups A, B, and C.

In such a case, an addition indicating whether the document belongs to the group A, the group B, or the group C, to the documents 510 to 560 belonging to the group A, the documents 610 to 630 belonging to the group B, and the documents 710 to 730 belonging to the group C. The mode of changing the display method of the thumbnail indicating the document (see FIG. 9A) is an example of addition to the thumbnail belonging to the thumbnail group, and is an example of addition of a different color for each thumbnail group. Further, the mode in which the icons AA, AB, and AC are added (see FIG. 9B) is an example of addition to the thumbnail belonging to the thumbnail group, and is an example of addition of different icons for each thumbnail group.

Process Example by Functional Configuration of Image Display Apparatuses 1*a* and 1*b*

Next, a process example by a functional configuration of the image display apparatuses 1*a* and 1*b* (see FIGS. 5 and 6) will be described with reference to FIG. 10. That is, the process example by the outline display processing unit 103 will be described.

FIG. 10 is a flowchart according to the first exemplary embodiment describing the process example by the outline display processing unit 103. Hereinafter, description will be made with reference to FIGS. 7A to 8B and the like describing the outline display described above.

For example, in a case where the workspace 41*a* is displayed on the operation screen 400*a* (see FIG. 9A), in a case where an outline display operation for the other workspace 41*b*, for example, mouse-over for the item 412 (see FIG. 8A) is detected (step S101), the acquisition unit 3*a* (see FIG. 6) acquires coordinate positions of all the documents 510 to 560, 610 to 630, and 710 to 730 (see FIG. 8B) existing in the other workspace 41*b* (step S102).

The outline display processing unit 103 executes a process by using the mouse-over as the outline display operation as a trigger. The outline display operation is not limited to the mouse-over, and a button for instructing the outline display may be arranged in the workspace 41*a* and clicking of the button may be a trigger for the process by the outline display processing unit 103.

By using the acquired coordinate positions, the calculation unit 3*c* (see FIG. 6) calculates representative points of the coordinate positions (positions of orthogonal coordinates of an X-axis and a Y-axis) of all documents (step S103). The representative point of the document includes, for example, a point at a center position of the document or a point in an upper left corner of the document.

The document grouping unit 3*b* (see FIG. 6) performs non-hierarchical clustering based on the calculated representative points of all the documents to perform grouping on all the documents (step S104). That is, a non-hierarchical cluster analysis using the "X-means method" (an improved version of the k-means method) is executed with the representative points of all the documents as a population. The documents are automatically classified without designating the number of clusters in advance.

As a result, the representative point of each document is classified into N cluster groups.

After that, a group is set for each document (step S105). That is, from the cluster analysis result using the "X-means method", information of the group classified for each document is linked.

The calculation unit 3*c* (see FIG. 6) extracts the representative point or a barycenter of each group (see reference numerals 4*a*2, 4*b*2, and 4*c*2 in FIG. 11B) (step S106), and calculates a component of a relative vector from the representative point of each group for each document (step S107).

The extraction of the barycenter is performed by holding the representative point (barycenter) of each group from the cluster analysis result using the "X-means method".

After that, the calculation unit 3*c* (see FIG. 6) calculates a radius of a virtual circle (see reference numerals 4*a*1, 4*b*1, and 4*c*1 in FIG. 11B) including the document of the group (step S108). The calculation of such a radius is performed by calculating the component of the relative vector from the representative point of each group and a distance between the two points (radius of the circle of the group) for each document.

Further, the calculation unit 3*c* (see FIG. 6) calculates a barycenter of N points connecting the representative points of each group (see reference numeral 4*d*2 in FIG. 12B) (step S109). After that, a virtual small circle (see reference numeral 4*d*3 in FIG. 12B) having the barycenter of the N points as a center point is formed (step S110).

Further, coordinates of the representative point (see reference numerals 4*a*2, 4*b*2, and 4*c*2 in FIG. 11B) of each group are moved in a direction of the barycenter of the N points (see reference numeral 4*d*2 in FIG. 12B) such that the "virtual circle of each group (see reference numerals 4*a*1, 4*b*1, and 4*c*1 in FIG. 11B)" and the "virtual small circle (see reference numeral 4*d*3 in FIG. 12B)" are circumscribed (see reference numeral 13B) (step S111).

After that, the "barycenter of the N points (see reference numeral 4*d*2 in FIG. 12B)" is moved to an origin (see reference numeral 4*e*3 in FIG. 13A) at a center coordinate of a drawing area which is the outline display unit (step S112).

The "barycenter of the N points (see reference numeral 4*d*2 in FIG. 13A)", the "representative point of each group (see reference numeral 4*a*2, 4*b*2, 4*c*2 in FIG. 13A)", and the coordinate position of the "representative point of each document" are relatively calculated and a thumbnail is drawn (step S113). In addition, thumbnail highlighting (see FIGS. 8B, 9A, and 9B) is performed so as to characterize that the documents are classified by group (step S114).

Next, the process example of the flowchart described above (see FIG. 10) will be additionally described with reference to FIGS. 11A to 14.

Figure 11A:
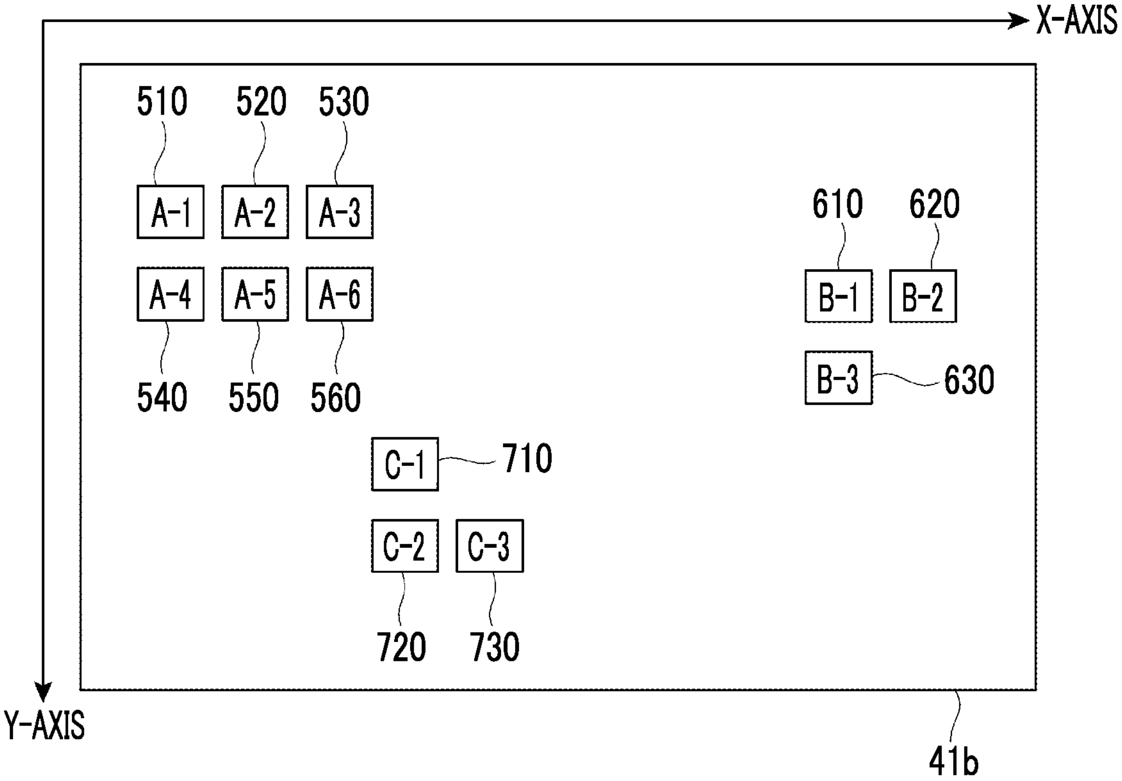
FIGS. 11A and 11B are diagrams illustrating a workspace for additionally describing the flowchart.
Figure 11B:
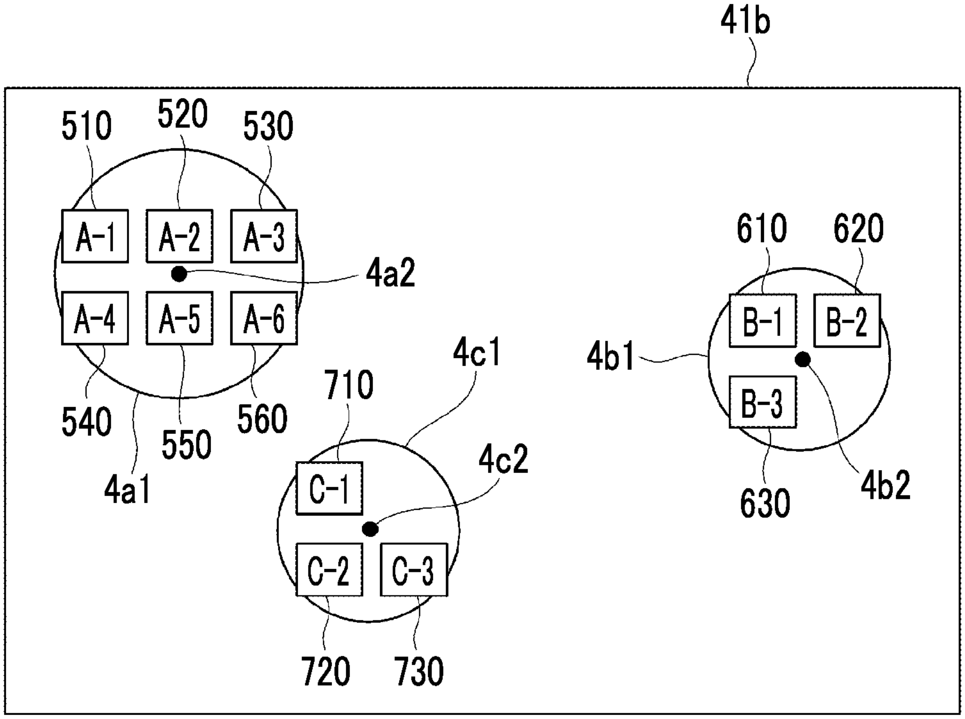

FIGS. 11A and 11B are diagrams illustrating the workspace 41*b* for additionally describing the flowchart, FIG. 11A is a diagram describing step S102, and FIG. 11B is a diagram describing steps S104 and S106, respectively.

In the workspace 41*b* illustrated in FIG. 11A, the coordinate position of each of the documents 510 to 560, 610 to 630, and 710 to 730 is acquired. For example, the coordinate positions of the documents 510 to 560 are (20, 30), (70, 30), (110, 30), (20, 70), (70, 70), and (110, 70) in order, the coordinate positions of the documents 610 to 630 are (300, 100), (350, 100), and (300, 150) in order, and the coordinate positions of the documents 710 to 730 are (60, 200), (60, 250), and (100, 250) in order.

In step S102 of the flowchart described above (see FIG. 10), the coordinate positions of all the documents 510 and the like existing in the workspace 41*b* are acquired in this manner. From such coordinate positions, the size of the document and the interval between the documents can be calculated.

In FIG. 11B, grouping is performed on the documents 510 to 560, the documents 610 to 630, and the documents 710 to 730, and the groups are set. That is, in step S104 of the flowchart described above (see FIG. 10), in the present example, the documents are classified into three cluster groups such that the documents 510 to 560 are classified into the group A, the documents 610 to 630 are classified into the group B, and the documents 710 to 730 are classified into the group C. Specifically, (20, 30), (70, 30), (110, 30), (20, 70), (70, 70), and (110, 70) are classified into the group A. Further, (300, 100), (350, 100), and (300, 150) are classified into the group B, and (60, 200), (60, 250), and (100, 250) are classified into the group C.

Further, in FIG. 11B, the representative point 4*a*2 of the group A, the representative point 4*b*2 of the group B, and the representative point 4*c*2 of the group C are illustrated. That is, in step S106 of the flowchart described above (see FIG. 10), in the present example, the representative point 4*a*2 of the group A is (67, 50), the representative point 4*b*2 of the group B is (316, 116), and the representative point 4*c*2 of the group C is (73, 233).

Figure 12A:
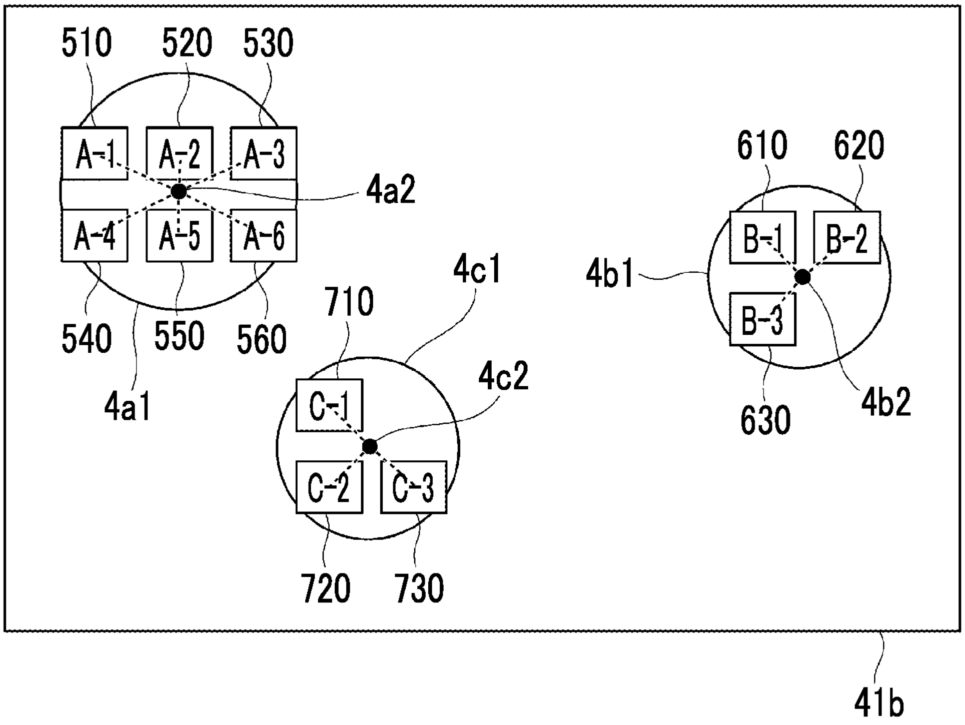
FIGS. 12A and 12B are diagrams illustrating a workspace for additionally describing the flowchart.
Figure 12B:
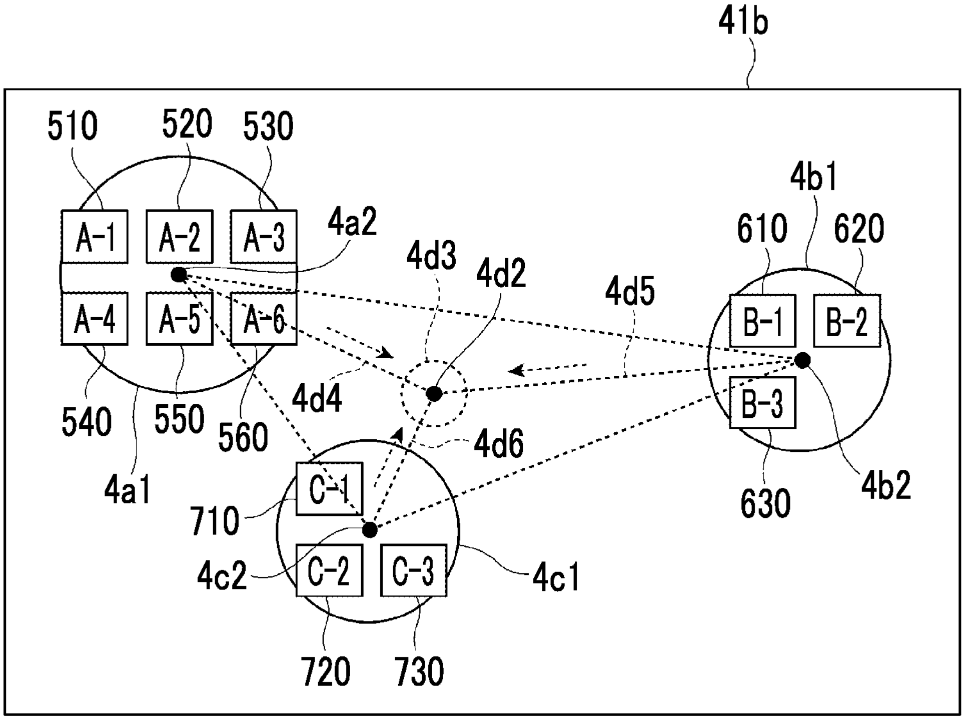

FIGS. 12A and 12B are diagrams illustrating the workspace 41*b* for additionally describing the flowchart, FIG. 12A is a diagram describing steps S107 to S108, and FIG. 12B is a diagram describing steps S109 to S111, respectively.

In the workspace 41*b* illustrated in FIG. 12A, for example, in the case of the group C, the representative point 4*c*2 is (73, 233), and a component of a relative vector of the document 710 of "C-1" to the representative point 4*c*2 is (−13, −33), and a distance between the two points (radius of the circle of the group) is approximately 35. Further, a relative vector component of the document 720 of "C-2" to the representative point 4*c*2 is (−13, 17), and a distance between the two points (radius of the circle of the group) is approximately 21. Further, a relative vector component of the document 730 of "C-3" to the representative point 4*c*2 is (27, 17), and a distance between the two points (radius of the circle of the group) is approximately 32. The vector components described above are illustrated by broken lines in FIG. 12A.

In the group C, in a case where the documents 710 to 730 are moved with respect to the representative point 4*c*2 based on the calculated distance between the two points, a movement distance is held in the intra-group document movement information holding unit 3*d* as intra-group document movement information (see FIG. 6). In a case where the documents 710 to 730 are not moved with respect to the representative point 4*c*2, the information is held in the intra-group document movement information holding unit 3*d*.

In this manner, in step S107 of the flowchart described above (see FIG. 10), the relative vector components are calculated, and in step S108, in a case of the group C, the maximum value "35" among "35", "21", and "32", which are the distances between the two points described above, is held as a "radius" of the circle indicating a range of the group.

The calculation can be performed on the group A and the group B in the same manner as in the case of the group C described above.

In the workspace 41*b* illustrated in FIG. 12B, the calculation of a barycenter of the 3N points connecting the representative points of each group is performed as in the following.

$$\vec{g} = \frac{\sum_{k=1}^{n} \vec{a_k}}{n} \quad \text{[Equation 1]}$$

More specifically, a center coordinate equation of the three points is as followings.

$$G\left(\frac{x_1 + x_2 + x_3}{3}, \frac{y_1 + y_2 + y_3}{3}\right) \quad \text{[Equation 2]}$$

In step S109 of the flowchart described above (see FIG. 10), a position of the barycenter 4*d*2 can be calculated by the equation described above. In the present example, the coordinate position of the barycenter 4*d*2 is (152, 133).

Further, the virtual small circle 4*d*3 in step S110 of the flowchart described above (see FIG. 10) is, in the present example, a small circle having a radius of 15 centered on the barycenter 4*d*2 of which the coordinate position is (152, 133).

A size of a value of the virtual small circle 4*d*3 may be changed depending on the display method. More specifically for this value, for example, by reducing the radius value, it is possible to eliminate more wasted space when the outline display is performed. Meanwhile, in a case where the radius value is too small, the distance with the documents in the other groups is reduced, so that it is not easy to view the documents.

Further, the coordinate movement of the representative point of each group in step S111 of the flowchart described above (see FIG. 10) is performed as follows.

That is, in FIG. 12B, first, a linear function equation of a line segment connecting the representative points 4*a*2, 4*b*2, and 4*c*2, which are center points of the "virtual circles 4*a*1, 4*b*1, and 4*c*1 of each group" and the barycenter 4*d*2, which is a center point of the "virtual small circle 4*d*3", with each other is calculated. In the present example, the group A has Y=0.9X−15, the group B has Y=−0.1X+148.2, and the group C has Y=−1.3X+326. That is, the linear function equation of the line segment 4*d*4 is Y=0.9X−15, the linear function equation of the line segment 4*d*5 is Y=−0.1X+148.2, and the linear function equation of the line segment 4*d*6 is Y=−1.3X+326.

A distance between the centers of the two circles based on the "radius of the virtual circles 4*a*1, 4*b*1, and 4*c*1 of each group" and the "radius of the virtual small circle 4*d*3" is calculated. Here, the group C is used as an example for calculation. It is assumed that the radius of the virtual circle 4*c*1 of the group C is "rc" and a value of the radius is 35. Further, the radius of the virtual small circle 4*d*3 is "rg", and a value of the radius is 15.

The "coordinates (x, y) of the representative point 4*c*2 of the group C" which is "d" satisfying d=rc+rg±ε (ε: tolerance) are calculated. A size of the tolerance here may be changed depending on the display method. By increasing the range of this tolerance, a calculation time is reduced and a response time to the user is reduced, in some cases.

In this manner, it is possible to calculate the distance between the coordinates (x, y) of the representative point 4*c*2 of the group C and the coordinates of the barycenter 4*d*2 after adjusting the arrangement. That is, in the present example, the coordinates of the representative point 4*c*2 are (120, 173), the coordinates of the barycenter 4*d*2 are (152, 133), and the distance is approximately 51.

The information indicating such a distance is held in the inter-group movement information holding unit 3*e* (see FIG. 6) as the inter-group movement information.

The calculation can be performed on the group A and the group B in the same manner as in the case of the group C described above.

Figure 13A:
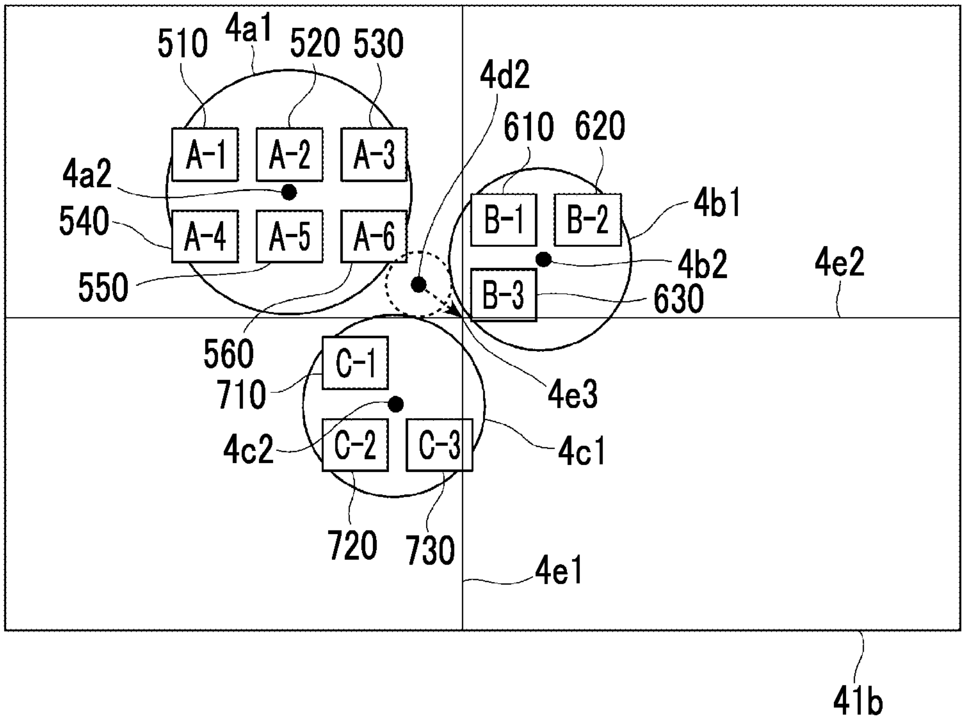
FIGS. 13A and 13B are diagrams illustrating a workspace for additionally describing the flowchart.
Figure 13B:
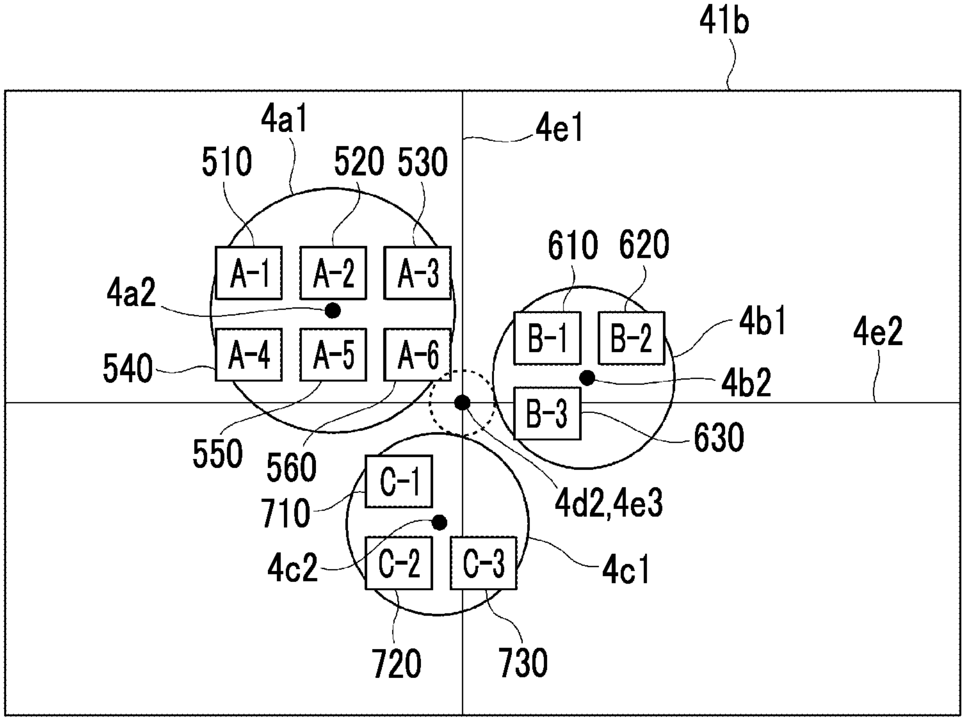
Figure 14:
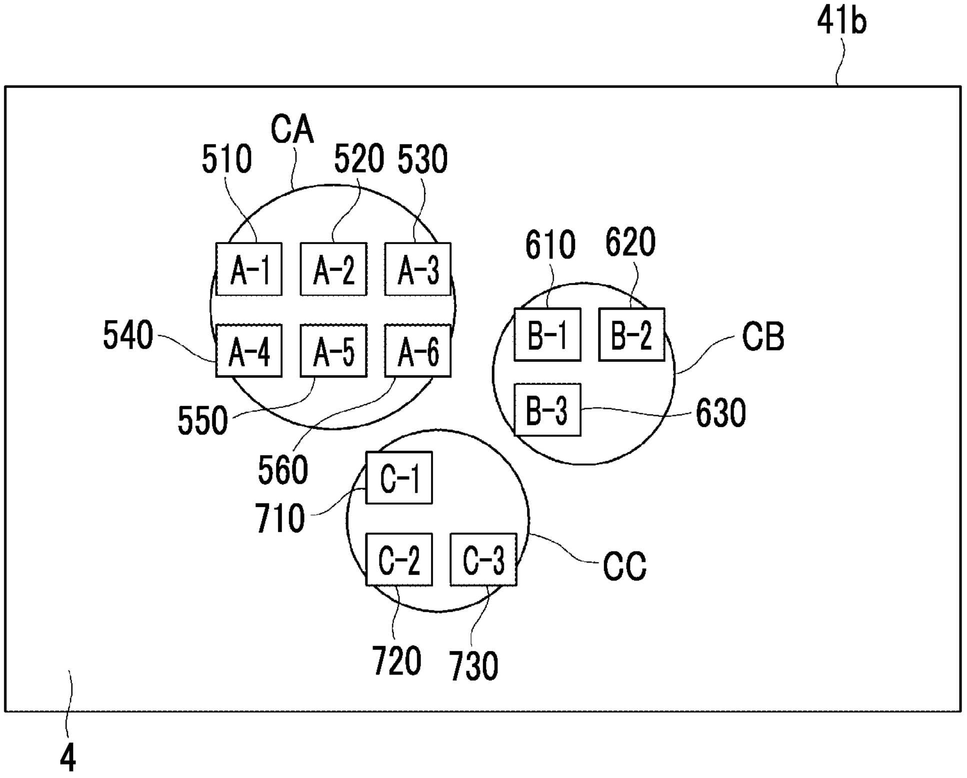
FIG. 14 is a diagram illustrating a workspace for additionally describing the flowchart, and is a diagram describing step S114.

FIGS. 13A, 13B, and 14 are diagrams illustrating the workspace 41*b* for additionally describing the flowchart, FIGS. 13A and 13B are diagrams describing step S112, and FIG. 14 is a diagram describing step S114.

As illustrated in FIG. 13A, after the virtual circles 4*a*1, 4*b*1, and 4*c*1 of each group and the virtual small circle 4*d*3 (see FIG. 12B) are circumscribed, the whole is moved such that a center of the barycenter 4*d*2 of the N points overlaps with the center coordinate 4*e*3 of the drawing area. As a result, as illustrated in FIG. 13B, the group A, the group B, and the group C are arranged at positions on a center side of the drawing area.

The drawing area is set by calculating a range in which all the documents can be displayed. Further, the position of the center coordinate 4*e*3 of the drawing area is an intersection point of a vertical line 4*e*1 and a horizontal line 4*e*2, and can be a center position of the workspace 41*b*.

In FIG. 14, the virtual circles 4*a*1, 4*b*1, and 4*c*1 represented in FIG. 13B, the representative points 4*a*2, 4*b*2, 4*c*2 of each group, the barycenter 4*d*2, and the virtual small circle 4*d*3 (see FIG. 12B) are not displayed, and the vertical lines 4*e*1, the horizontal lines 4*e*2, and the center coordinates 4*e*3 are not displayed either.

Further, in FIG. 14, the circular images CA, CB, and CC are added as thumbnail highlighting in step S114 of the flowchart described above (see FIG. 10) (see the first mode in FIG. 8B).

In this manner, the outline display by the outline display processing unit 103 (see FIGS. 5 and 6) is generated, and the outline display unit 4 can be displayed.

The documents 510 to 560, 610 to 630, and 710 to 730 (see FIG. 14) of the workspace 41*b* here are examples of thumbnails to be reduced and displayed. Further, the group A, the group B, and the group C are thumbnail groups to which the thumbnails belong, and are examples of the thumbnail groups determined by arrangement of the thumbnails.

For example, the outline display of the outline display unit 4 is an example of a mode in which the documents belonging to the group A and the documents 610 to 630 and 710 to 730 other than the documents 510 to 560 belonging to the group A are arranged to be close to each other. The documents 510 to 560, 610 to 630, and 710 to 730 in the outline display are examples of a reduction display performed in this mode.

Further, an inside of a frame of the outline display unit 4 is an example of a predetermined area, and the mode in which the documents 510 to 560 and the other documents 610 to 630 and 710 to 730 are arranged in a fitted manner in the frame of the outline display unit 4 is an example of an arrangement mode.

In such a case, the documents 510 to 560 of the group A may be arranged while maintaining a distance between the documents 510 to 560, or the documents 510 to 560 of the group A may be arranged so as to shorten the distance while maintaining a relative position. Further, in a case where the group B exists in addition to the group A, the group A and the group B may be arranged to be close to each other.

FIGS. 15A and 15B are diagrams illustrating information stored in the non-volatile memory 14 of the image display apparatuses 1*a* and 1*b*, FIG. 15A illustrates the work area information 14*c*, and FIG. 15B illustrates the document information 14*d*. The work area information 14*c* is stored in the work area management unit 14*a* (see FIG. 3), and the document information 14*d* is stored in the document information management unit 14*b* (see FIG. 3).

The work area information 14*c* illustrated in FIG. 15A includes a work area ID for specifying a work area (see reference numerals 42 and 43 in FIG. 3) and a work area name corresponding to the work area ID.

Further, the document information 14*d* illustrated in FIG. 15B includes a document ID, a document name corresponding to the document ID, and X and Y coordinates as coordinate information of the document. Such document information 14*d* is information acquired by the acquisition unit 3*a* (see FIG. 6).

Second Exemplary Embodiment

Next, the image display apparatuses 1*a* and 1*b* according to a second exemplary embodiment will be described. Since the second exemplary embodiment has the same configuration, process, and the like as the case of the first exemplary embodiment described above, the same reference numerals are used for the common configuration and the like, and the description thereof may be omitted.

Figure 16:
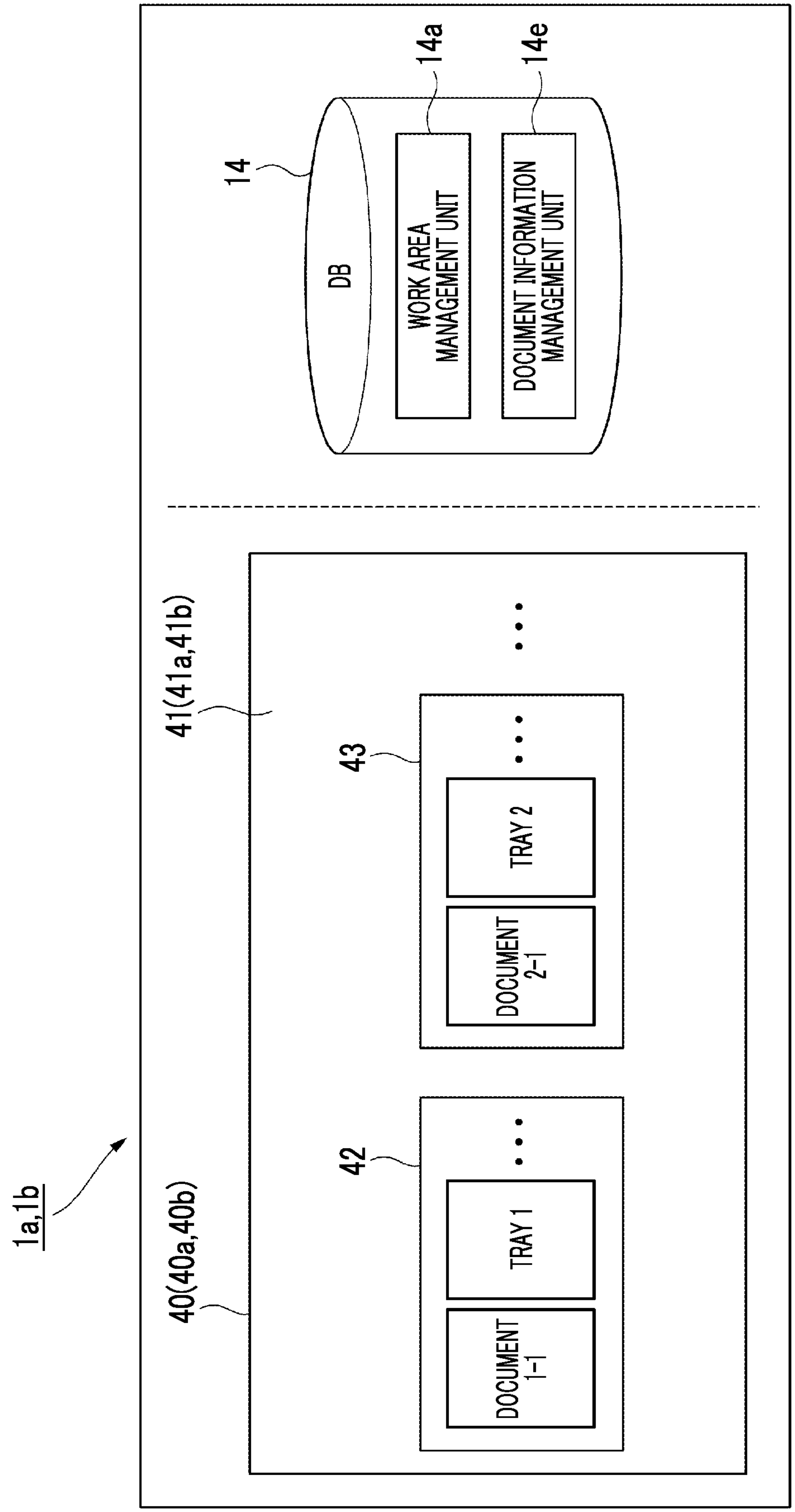
FIG. 16 is a diagram illustrating a configuration example of an image display apparatus according to a second exemplary embodiment.

FIG. 16 is a diagram illustrating a configuration example of the image display apparatuses 1*a* and 1*b* according to the second exemplary embodiment, and corresponds to FIG. 3, which describes the first exemplary embodiment.

In the image display apparatuses 1*a* and 1*b* illustrated in FIG. 16, in addition to storing the "document 1-1" in the work area 42, and a "tray 1" is set, as thumbnail information. In addition to storing the "Document 2-1" in the work area 43, "Tray 2" is set.

In this manner, the second exemplary embodiment is different from the first exemplary embodiment (see FIG. 3) in that the trays 1 and 2 including thumbnails of a plurality of documents are provided.

Further, in a database as the non-volatile memory 14, an object information management unit 14*e* is set in addition to the work area management unit 14*a*. The object information management unit 14*e* has object information such as an object ID and an object name (see, for example, reference numeral 14*f* in FIG. 22).

Figure 17A:
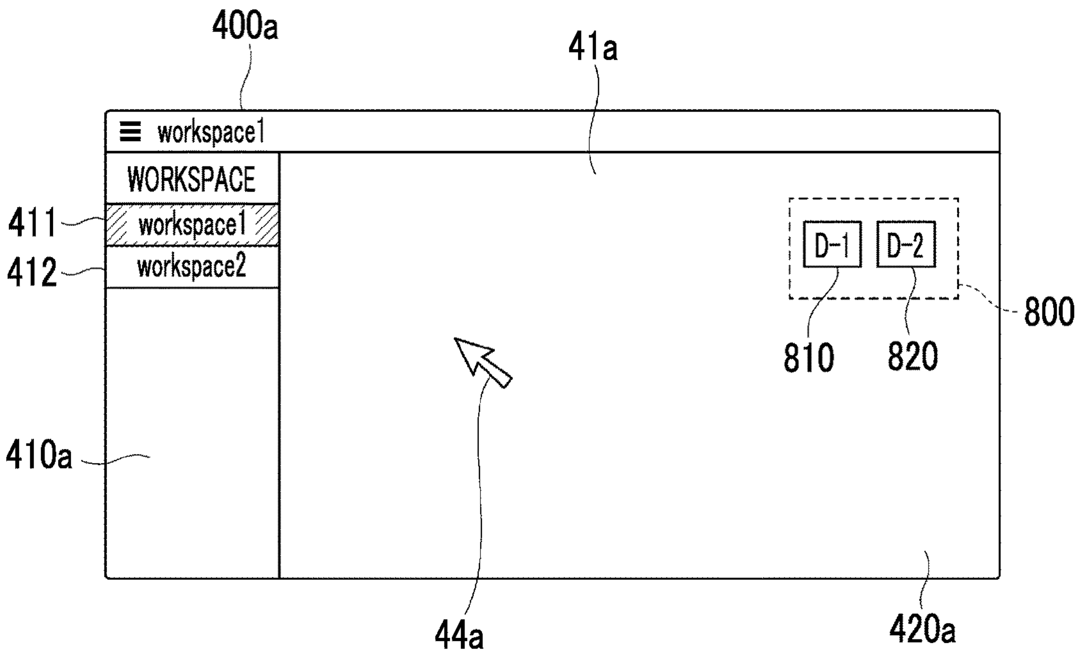
FIGS. 17A and 17B are diagrams describing an operation screen of the image display apparatus.
Figure 17B:
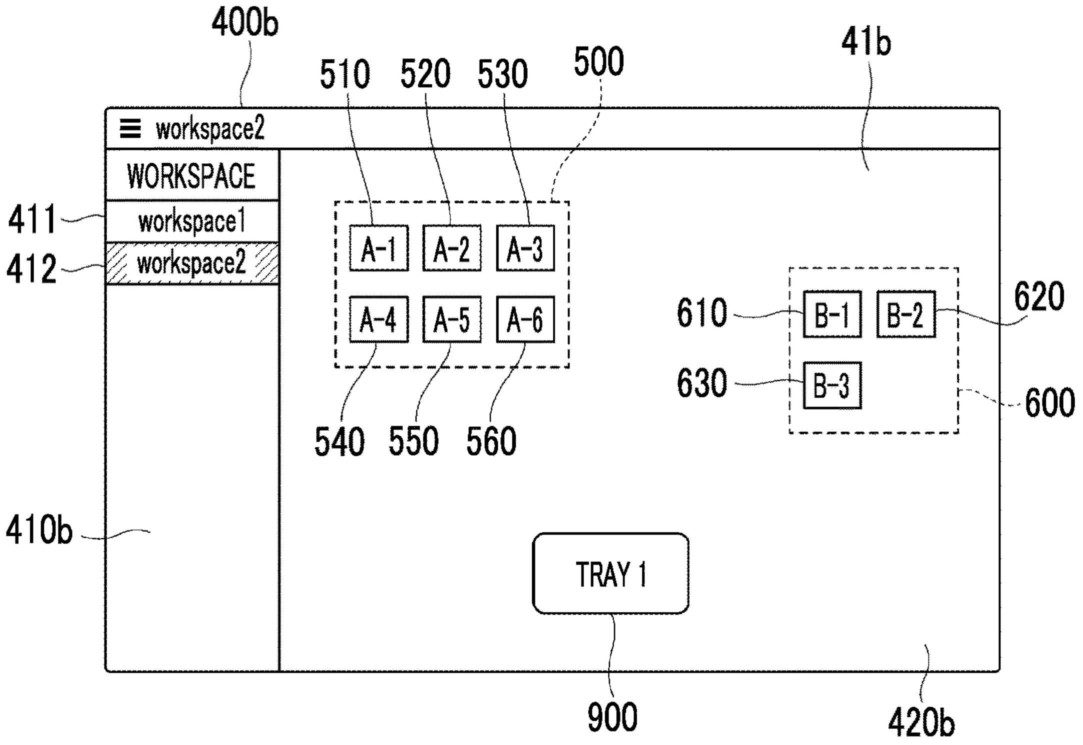
Figure 18A:
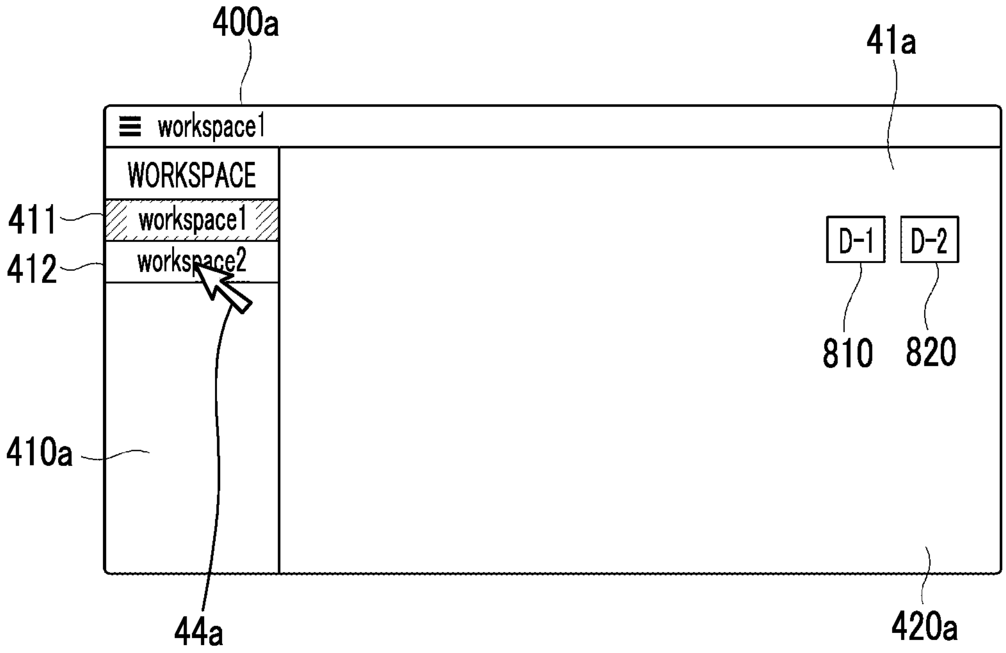
FIGS. 18A and 18B are diagrams describing the operation screen of the other image display apparatus.
Figure 18B:
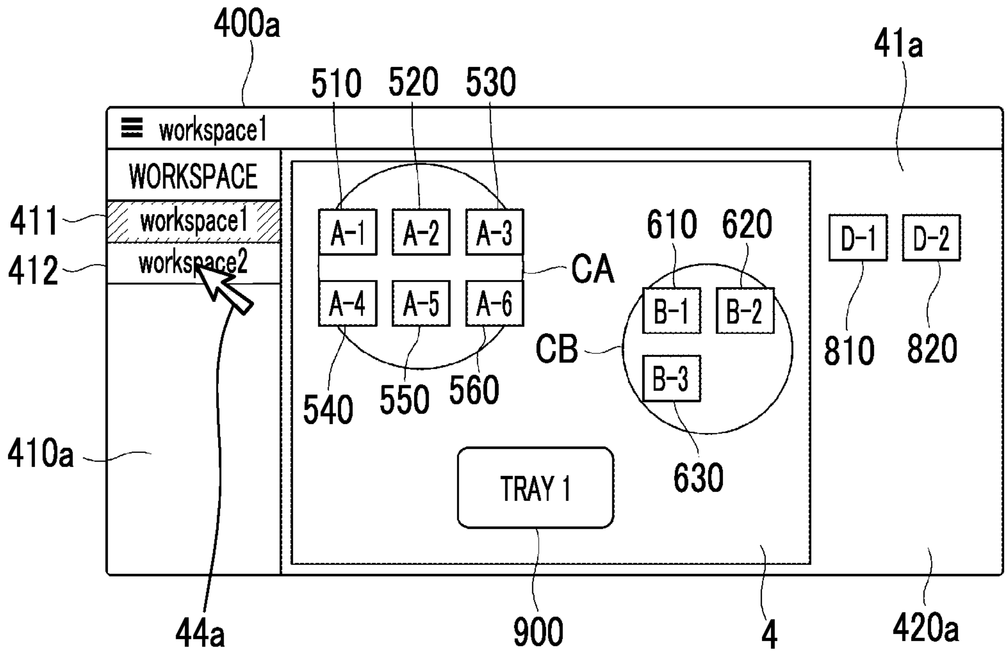

FIGS. 17A and 17B and FIGS. 18A and 18B are diagrams illustrating the operation screens 400*a* and 400*b* of the image display apparatuses 1*a* and 1*b*, FIG. 17A illustrates the operation screen 400*a* of the image display apparatus 1*a*, and FIGS. 17B, 18A, and 18B illustrate the operation screen 400*b* of the image display apparatus 1*b*. FIGS. 17A to 18B correspond to FIGS. 7A to 8B, which describe the first exemplary embodiment. For easy reference of the drawings, FIG. 17A illustrates the same manner as FIG. 7A, and FIG. 18A illustrates the same manner as FIG. 8A.

In the operation screen 400*b* illustrated in FIG. 17B, the document 510 of "A-1", the document 520 of "A-2", the document 530 of "A-3", the document 540 of "A-4", the document 550 of "A-5", and the document 560 of "A-6" are displayed in the area of the document 500 in the upper left corner.

Further, in the workspace display unit 420*b*, the document 610 of "B-1", the document 620 of "B-2", and the document 630 of "B-3" are arranged in the area of the document 600 located on the right side.

Further, a tray 900 of the "tray 1" is arranged on a center downside of the workspace display unit 420*b*.

The second exemplary embodiment is different from the first exemplary embodiment (see FIG. 7B) in that the tray 900 is arranged on the workspace display unit 420*b*.

By mouse-over as illustrated in FIG. 18A, the outline display unit 4 is displayed in the workspace 41*a* as illustrated in FIG. 18B. The tray 900 is displayed on the outline display unit 4 together with the document 510 and the like.

Next, a process example by a functional configuration of the image display apparatus 1 will be described.

FIG. 19 is a flowchart according to the second exemplary embodiment describing the process example by the outline display processing unit 103 (see FIGS. 5 and 6), and corresponds to FIG. 10, which describes the first exemplary embodiment. In FIG. 19, steps S201 to S205 and S209 to S217 among steps S201 to S217 correspond to steps S101 to S114 in FIG. 10, respectively. Therefore, steps S206 to S208 will be described below. Further, steps S206 to S208 are processes related to the tray.

The acquisition unit 3*a* (see FIG. 6A) acquires coordinate positions of all the trays (see FIG. 18B) existing in the other workspace 41*b* (step S206). By using the acquired coordinate positions, the calculation unit 3*c* (see FIG. 6) calculates representative points of the coordinate positions of all the trays (positions of orthogonal coordinates of the X-axis and the Y-axis) (step S207).

After that, all the trays are set as a single group (step S208).

Next, the process example of the flowchart described above (see FIG. 19) will be additionally described with reference to FIGS. 20A to 21B.

Figure 20A:
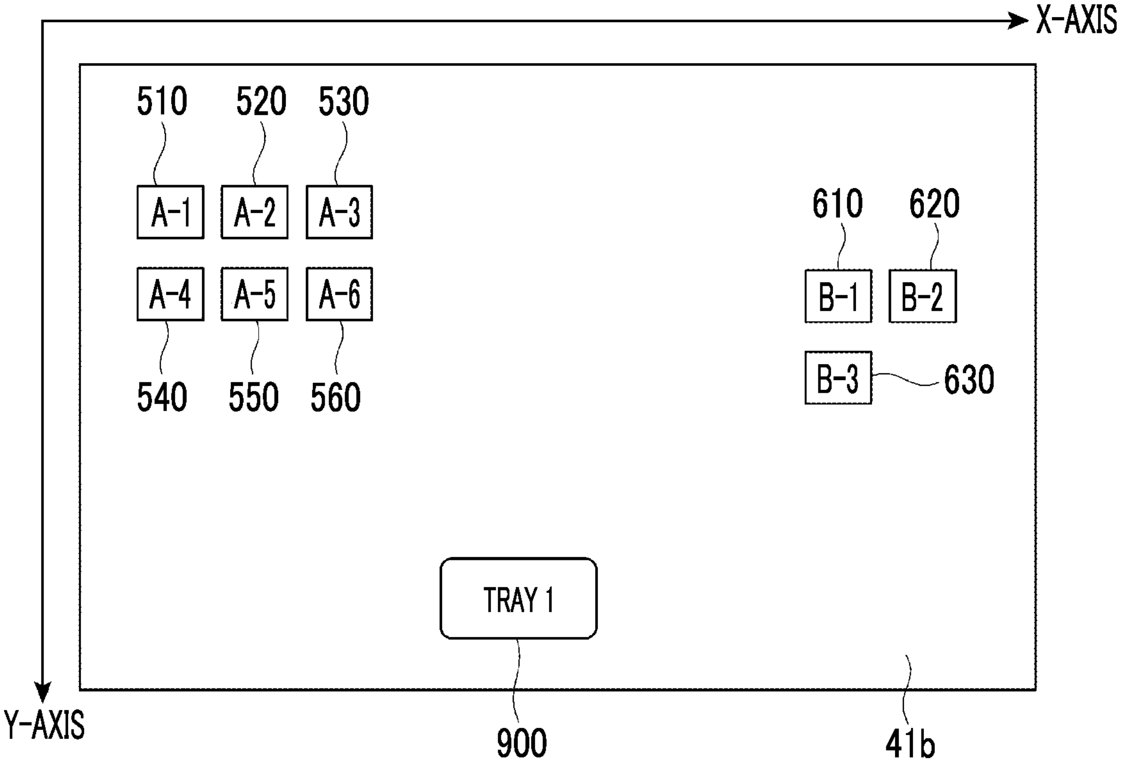
FIGS. 20A and 20B are diagrams illustrating a workspace for additionally describing the flowchart.
Figure 20B:
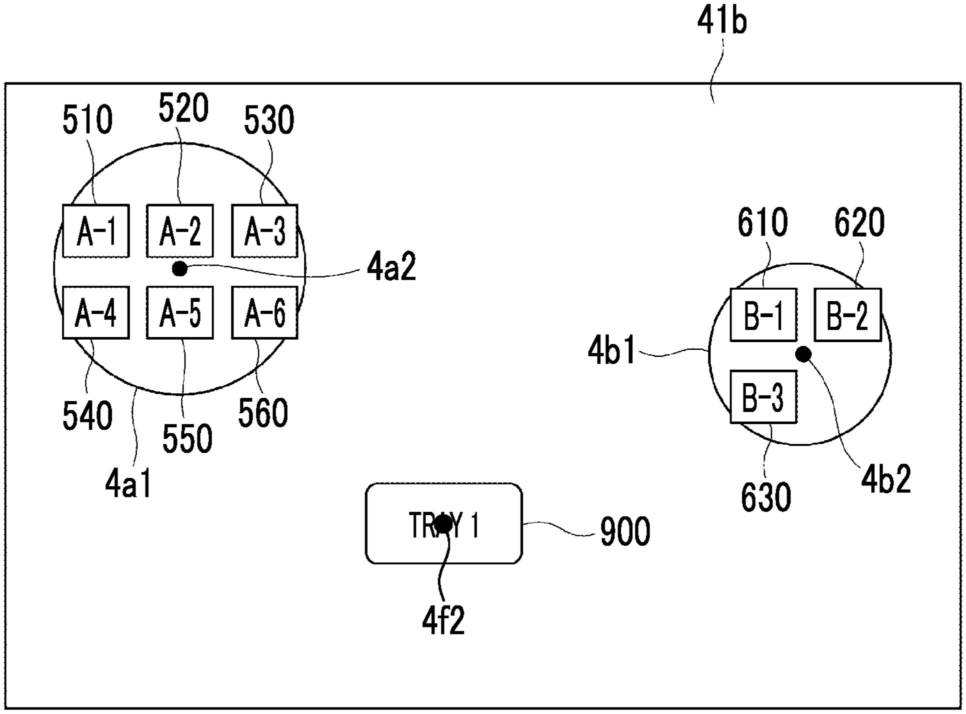

FIGS. 20A and 20B are diagrams illustrating the workspace 41*b* for additionally describing the flowchart, FIG. 20A is a diagram describing steps S202 and S206, and FIG. 20B is a diagram describing steps S204 and S209, respectively. FIGS. 20A and 20B correspond to FIGS. 11A and 11B, which describe the first exemplary embodiment.

In the workspace 41*b* illustrated in FIG. 20A, the coordinate position of each of the documents 510 to 560 and 610 to 630 are acquired (see step S202), and the coordinate position of the tray 900 is also acquired (see step S206).

It is assumed that the coordinate positions of the documents 510 to 560 and 610 to 630 are the same as the coordinate positions of the first exemplary embodiment. Further, it is assumed that the coordinate position of the tray 900 is (73, 233).

In FIG. 20B, the documents 510 to 560 and the documents 610 to 630 are grouped and the groups are set (see step S205). The tray 900 is set as a single group (see step S208).

Further, in FIG. 20B, the representative point 4*a*2 of the group A, the representative point 4*b*2 of the group B, and the representative point 4*f*2 of the tray 1 are illustrated. By extracting the representative points 4*a*2, 4*b*2, and 4*f*2 (see step S209), in the present example, the representative point 4*a*2 of the group A is (67, 50), the representative point 4*b*2 of the group B is (316, 116), and the representative point 4*f*2 of the tray 1 is (73, 233).

Figure 21A:
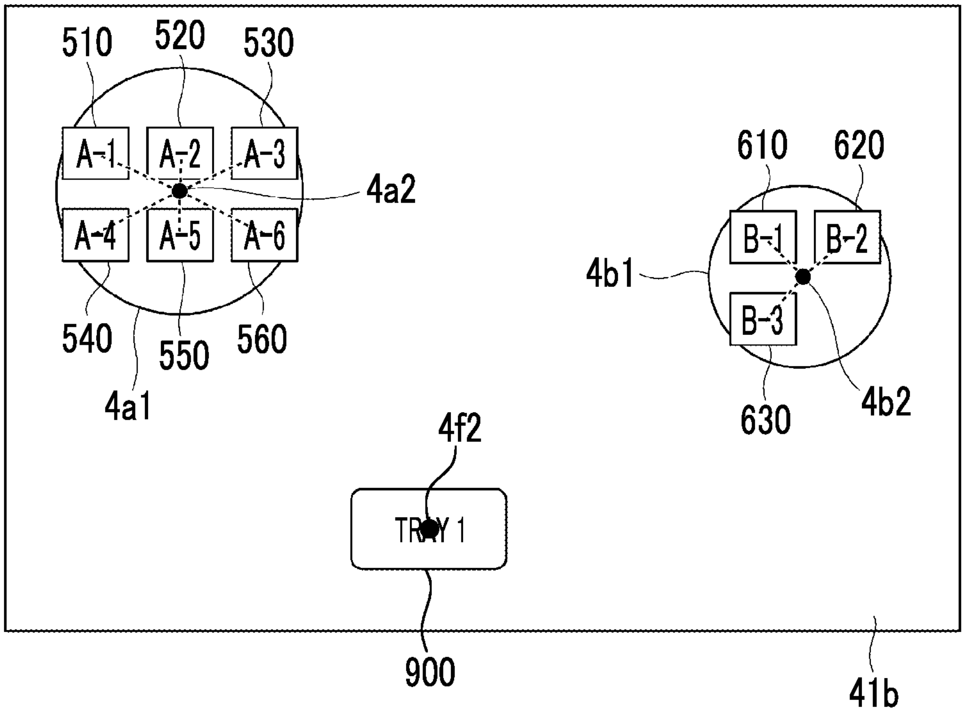
FIGS. 21A and 21B are diagrams illustrating a workspace for additionally describing the flowchart.
Figure 21B:
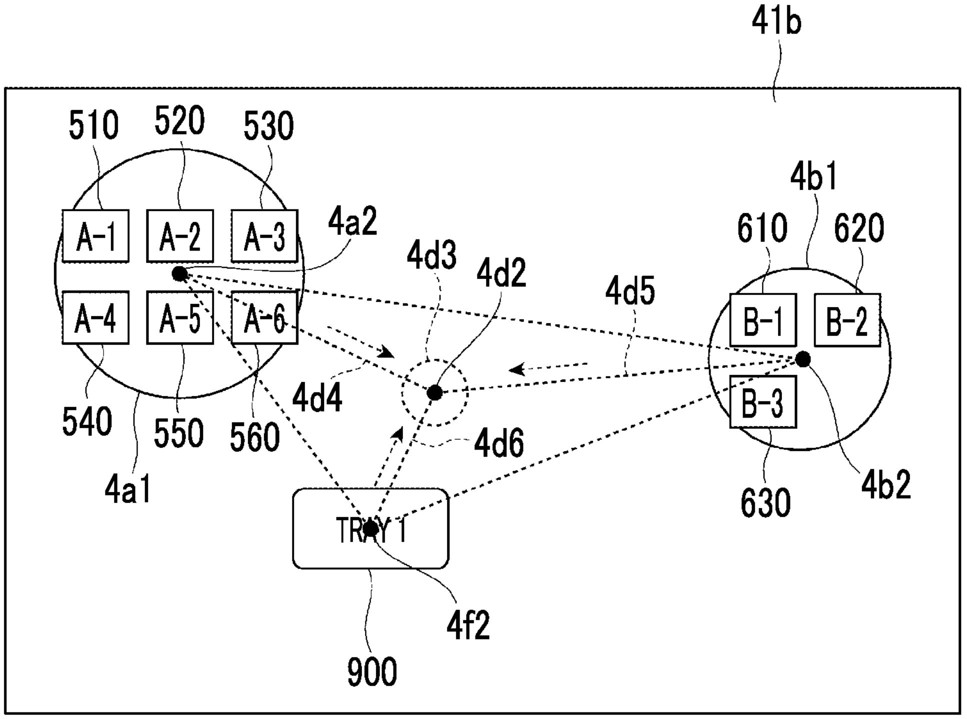

FIGS. 21A and 21B are diagrams illustrating the workspace 41*b* for additionally describing the flowchart, FIG. 21A is a diagram describing steps S210 to S211, and FIG. 21B is a diagram describing steps S212 to S214, respectively. FIGS. 21A and 21B correspond to FIGS. 12A and 12B, which describe the first exemplary embodiment. Further, steps S210 to S211 correspond to steps S107 to S108, and steps S212 to S214 correspond to steps S109 to S111 in the first exemplary embodiment.

In the workspace 41*b* illustrated in FIG. 21A, a vector component connecting the documents 510 to 560 and the representative point 4*a*2 in the group A is illustrated by a broken line, and a vector component connecting the documents 610 to 630 and the representative point 4*bs* in the group B is also illustrated by a broken line. Since the tray 900 is a single group, such vector components are not illustrated.

In the workspace 41*b* illustrated in FIG. 21B, the representative point 4*a*2 of the group A is moved to the barycenter 4*d*2 along the line segment 4*d*4 such that the virtual circle 4*a*1 touches the virtual small circle 4*d*3. In the same manner, the same applies to the representative point 4*b*2 of the group B.

Further, since there is no virtual circle for the representative point 4*f*2 of the group C, the tray 900 moves along the line segment 4*d*6 such that a contour of the tray 900 is close to the virtual small circle 4*d*3.

FIG. 22 is a diagram the illustrating the object information 14*f* stored in the non-volatile memory 14 of the image display apparatuses 1*a* and 1*b*. Such object information is stored in the object information management unit 14*e* (see FIG. 16). Since the work area information 14*c* stored in the work area management unit 14*a* (see the figure) of the non-volatile memory 14 is the same as the work area information 14*c* in FIG. 15A, which describes the first exemplary embodiment, and the description thereof will be omitted.

The object information 14*f* illustrated in FIG. 22 includes an object ID of a document and a tray, an object name corresponding to the object ID, an object type, and X and Y coordinates as coordinate information. Such object information 14*f* is information acquired by the acquisition unit 3*a* (see FIG. 6).

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:

a processor configured to:

determine a thumbnail group to which a thumbnail as a target in a reduction display belongs by arranging the thumbnail; and perform, in response to there being a plurality of thumbnail groups, the reduction display in a mode of arranging the thumbnail belonging to the thumbnail group and another thumbnail not belonging to the thumbnail group in a fitted manner in a predetermined area such that a distance of each of the respective thumbnail groups to a barycenter of the plurality of thumbnail groups is equal to a radius of a circle centered on the barycenter.

2. The information processing apparatus according to claim 1, wherein in the mode of arranging in the fitted manner, the thumbnails of the thumbnail group are arranged such that a distance between the thumbnails of the thumbnail group is maintained.

3. The information processing apparatus according to claim 1, wherein in the mode of arranging in the fitted manner, thumbnails of the thumbnail group are arranged such that a distance between the thumbnails of the thumbnail group is shortened while maintaining a relative position between the thumbnails of the thumbnail group.

4. The information processing apparatus according to claim 1, wherein the reduction display is displayed in a mode of illustrating the thumbnail group to which the thumbnail belongs.

5. The information processing apparatus according to claim 4, wherein in the mode of illustrating the thumbnail group, an area including at least a part of the thumbnail belonging to the thumbnail group is added.

6. The information processing apparatus according to claim 5, wherein the added area is distinguishable for each thumbnail group.

7. The information processing apparatus according to claim 6, wherein a different color is added to each thumbnail group.

8. The information processing apparatus according to claim 4, wherein the mode of illustrating the thumbnail group is added to the thumbnail belonging to the thumbnail group.

9. The information processing apparatus according to claim 8, wherein the addition to the thumbnail is an addition of a different color for each thumbnail group.

10. The information processing apparatus according to claim 8, wherein the addition to the thumbnail is an addition of a different icon for each thumbnail group.

11. A non-transitory computer readable medium storing a program causing an information processing apparatus to realize:

a function of determining a thumbnail group to which a thumbnail as a target in a reduction display belongs by arranging the thumbnail; and a function of performing, in response to there being a plurality of thumbnail groups, the reduction display in a mode of arranging the thumbnail belonging to the thumbnail group and another thumbnail not belonging to the thumbnail group in a fitted manner in a predetermined area such that a distance of each of the respective thumbnail groups to a barycenter of the plurality of thumbnail groups is equal to a radius of a circle centered on the barycenter.

12. An information processing method comprising:

determining a thumbnail group to which a thumbnail as a target in a reduction display belongs by arranging the thumbnail; and performing, in response to there being a plurality of thumbnail groups, the reduction display in a mode of arranging the thumbnail belonging to the thumbnail group and another thumbnail not belonging to the thumbnail group in a fitted manner in a predetermined area such that a distance of each of the respective thumbnail groups to a barycenter of the plurality of thumbnail groups is equal to a radius of a circle centered on the barycenter.

* * * * *